*(12)* United States Patent
Horgan

(10) Patent No.: US 8,850,200 B1
(45) Date of Patent: Sep. 30, 2014

(54) METHOD AND APPARATUS FOR SECURE COMMUNICATIONS THROUGH A TRUSTED INTERMEDIARY SERVER

(75) Inventor: Michael J. Horgan, Sacramento, CA (US)

(73) Assignee: Synectic Design, LLC, Sacramento, CA (US)

( * ) Notice: Subject to any disclaimer, the term of this patent is extended or adjusted under 35 U.S.C. 154(b) by 155 days.

(21) Appl. No.: 13/528,712

(22) Filed: Jun. 20, 2012

Related U.S. Application Data

(60) Provisional application No. 61/499,605, filed on Jun. 21, 2011.

(51) Int. Cl.
*G06F 15/16* (2006.01)

(52) U.S. Cl.
USPC ........... 713/168; 713/150; 713/155; 380/277; 709/201; 726/12

(58) Field of Classification Search
CPC  G06Q 20/02; H04L 63/0428; H04L 63/0435; H04L 63/0442; H04L 9/08; H04L 63/0471
USPC .......... 713/150, 155, 168; 709/201; 380/277; 726/12
See application file for complete search history.

(56) References Cited

U.S. PATENT DOCUMENTS

| | | | |
|---|---|---|---|
| 5,123,045 A * | 6/1992 | Ostrovsky et al. ............ 713/190 |
| 5,249,230 A | 9/1993 | Mihm, Jr. |
| 5,283,829 A | 2/1994 | Anderson |
| 5,301,246 A | 4/1994 | Archibald et al. |
| 5,369,708 A * | 11/1994 | Kawamura et al. ............. 380/30 |
| 5,428,745 A | 6/1995 | de Bruijn et al. |
| 5,455,863 A | 10/1995 | Brown et al. |
| 5,491,750 A | 2/1996 | Bellare et al. |
| 5,491,752 A | 2/1996 | Kaufman et al. |
| 5,604,801 A * | 2/1997 | Dolan et al. ................... 713/159 |
| 5,613,012 A | 3/1997 | Hoffman et al. |
| 5,673,316 A * | 9/1997 | Auerbach et al. ............... 705/51 |
| 5,742,596 A | 4/1998 | Baratz et al. |
| 5,862,220 A * | 1/1999 | Perlman ........................ 713/162 |
| 6,070,243 A | 5/2000 | See et al. |
| 6,446,206 B1 | 9/2002 | Feldbaum |
| 7,051,199 B1 * | 5/2006 | Berson et al. .................. 713/150 |
| 7,076,654 B2 * | 7/2006 | Kawamoto ..................... 713/163 |
| 7,383,438 B2 * | 6/2008 | Fahrny et al. .................. 713/169 |
| 7,421,583 B1 * | 9/2008 | Berson et al. .................. 713/170 |
| 7,644,268 B2 * | 1/2010 | Filipi-Martin et al. ........ 713/153 |
| 7,689,707 B2 * | 3/2010 | Chobert et al. ................ 709/234 |
| 7,702,107 B1 * | 4/2010 | Messing ........................ 380/259 |

(Continued)

OTHER PUBLICATIONS

Schneier, B.—Applied Cryptography—John Wiley & Sons Inc., Second Edition, 1996, pp. 516.

*Primary Examiner* — Kambiz Zand
*Assistant Examiner* — Tongoc Tran
(74) *Attorney, Agent, or Firm* — John P. O'Banion

(57) ABSTRACT

A method and apparatus for a trusted intermediary server to assist with the secure exchange of data across a communications network, and in particular a packet-based network, such as the public Internet or an intranet. Communications are routed between private ports of the clients through the trusted intermediary server, with the private key transfer supported by a second type of communication medium. Although the trusted intermediary server negotiates the connection and is involved in the process, the communicants can perform their own key agreement and authentication for protecting data routed through the system.

20 Claims, 18 Drawing Sheets

(56) References Cited

U.S. PATENT DOCUMENTS

| | | |
|---|---|---|
| 7,743,247 B1 | 6/2010 | Horgan et al. |
| 7,991,993 B2 * | 8/2011 | Josset et al. ............ 713/153 |
| 8,060,742 B2 | 11/2011 | Horgan et al. |
| 8,316,233 B2 * | 11/2012 | Errico ...................... 713/165 |
| 2001/0023487 A1 * | 9/2001 | Kawamoto ................ 713/202 |
| 2010/0169223 A1 * | 7/2010 | Yuan ........................ 705/67 |
| 2011/0307383 A1 * | 12/2011 | Ratica ...................... 705/44 |
| 2012/0106738 A1 * | 5/2012 | Belenkiy et al. .......... 380/270 |
| 2012/0110462 A1 * | 5/2012 | Eswaran et al. .......... 715/736 |
| 2012/0233236 A1 * | 9/2012 | Chen et al. ................ 709/201 |

\* cited by examiner

FIG. 11

ACME Datacom's AltNet

File  Caller  Recipient  View  Action  Help

Caller
David Doe
Acct: 7315997-000
Name: David Doe
Comp: ACME Datacom, Inc.
Addr: 2000 Professional Drive, Suite 150
City: Roseville, CA 95661 USA
Phone: 136
E-mail: davidkdoe@juno.com

Recipient
Doug Cartwheel
Acct: 5970360I-000
Name: Doug Cartwheel
Comp: ACME Datacom, Inc.
Addr: 2000 Professional Drive, Suite 150
City: Roseville, CA 95661 USA
Phone: 135
E-mail:

Send Files | Send Log | Receive Log | File Manager | Setup

View Contents | Delete Log Entry | Clear Log | Log Report | ☑ Show All

| Recipient | Company | Account | Date/Markuse | Files | Bytes | Status |
|---|---|---|---|---|---|---|
| David Rae | ACME Datacom | 32300749-000 | 7/24/97 4:16pm | 0 | 0 | -34: Operator |
| Doug Cartwheel | ACME Datacom | 5970360I-000 | 7/24/97 4:17pm | 2 | 31,744 | 0: OK |
| Doug Cartwheel | ACME Datacom | 5970360I-000 | 7/24/97 4:17pm | 0 | 0 | -34: Operator |

Caller

| Field | Value |
|---|---|
| Name | Allen, Markus [001] |
| Company | ACME Datacom - 1, Inc. |
| Addr Line1 | 2000 Douglas Blvd. |
| Addr Line2 | Suite 100 |
| City, State, Zip | Roseville, CA 95661 |
| Country | USA |
| Phone | 7710537 | Account | 74702126 |
| E-mail: | MarkusAlvaAllen@gmail.com |

Recipient

| Field | Value |
|---|---|
| Name | Connor, Sam [003] |
| Company | ACME Datacom - 3, Inc. |
| Addr Line1 | 2000 Professional Drive |
| Addr Line2 | |
| City, State, Zip | Roseville, CA 95661 |
| Country | USA |
| Phone | 7714918 | Account | 11771161 |
| E-mail: | |

Send File | Send Log | Receive Log | File Manager | Setup

| Person Name | Company | Account | Date & Markuse | Files | Size | Status | Se |
|---|---|---|---|---|---|---|---|
| Sender - 1 | Company - 1 | 41111111 002 | 11/12/96 4:47:09 PM | 1 | 1.98 | 0 | Se |
| Sender - 5 | abc - 2 | 41111111 001 | 11/11/96 4:48:09 PM | 3 | 2.98 | 1 | Se |
| Sender - 2 | bcd - 1 | 51111111 003 | 09/11/96 4:49:09 PM | 2 | 1.98 | 0 | Se |
| Sender - 1 | def - 1 | 51111111 004 | 11/11/96 4:47:09 PM | 1 | 3.98 | 1 | Se |
| Sender - 3 | ghi - 3 | 61111111 007 | 11/10/96 4:48:09 PM | 2 | 1.98 | 0 | Se |
| Sender - 1 | jkl - 1 | 71111111 001 | 10/13/96 4:49:09 PM | 1 | 4.98 | 0 | Se |
| Sender - 2 | Company - 1 | 81111111 002 | 11/13/96 4:47:09 PM | 2 | 5.98 | 0 | Se |
| Sender - 1 | Company - 4 | 91111111 002 | 11/13/96 4:48:09 PM | 1 | 1.98 | 0 | Se |
| Sender - 1 | Company - 5 | 11111111 002 | 11/13/96 4:49:09 PM | 1 | 1.98 | 0 | Se |

METHOD AND APPARATUS FOR SECURE COMMUNICATIONS THROUGH A TRUSTED INTERMEDIARY SERVER

CROSS-REFERENCE TO RELATED APPLICATIONS

This application claims priority from U.S. provisional patent application Ser. No. 61/499,605 filed on Jun. 21, 2011, incorporated herein by reference in its entirety.

This application is related to U.S. patent application Ser. No. 08/908,994 filed on Aug. 8, 1997, now U.S. Pat. No. 7,743,247 issued on Jun. 22, 2010, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The invention pertains generally to a method and apparatus for the secure communication of data, and more specifically, to a method and apparatus for the delivery of secure encrypted data over the internet through a trusted intermediary in combination with a secondary medium.

2. Description of Related Art

Modern industries and professions require the rapid delivery of a variety of communications in a secure manner. Toward this end, numerous mechanisms have been developed which provide various levels of document encryption, and other security mechanisms.

However, these mechanisms do not readily and conveniently address maintaining confidence during the delivery process.

Accordingly, there is a need for a system which provides secure communications over a public network media. The present invention fulfills that need in a convenient communications system operating in concert with a selected packet-based network, or networks.

BRIEF SUMMARY OF THE INVENTION

The present invention describes method and apparatus for delivering a reliable, fast and highly secure communications through a trusted intermediary server between authorized parties who may be remotely located with access available over a publicly accessible packet-based network, or networks, such as those utilizing the internet protocol (IP) or similar digital networking protocols. These networks include, but are not limited to, local area networks, wide area networks, metropolitan area networks, campus area networks and virtual private networks, as well as the Internet and intranets.

The security of data sent over various networks, is important for many computer applications and systems. With a large network or a network that involves access via a public infrastructure, it is impractical to assure the physical security of the communications channel. Even with a single location, the size and configuration of most networks (e.g., wires, wireless environments, fiber optic cables, switching hardware, and so forth) make it expensive or impossible to assure that communications are not being monitored.

The present invention provides a packet-based network communications system which is easy to operate, inexpensive, reliable, widely available, fast and secure. Existing networks, such as the Internet and certain intranets, and the Public Switched Telephone Network (PSTN), may be used to obtain some of these characteristics. Each is potentially inexpensive, widely available, and reliable. However, these public packet networks and telecommunications networks are rarely sufficiently secure when exchanging sensitive information.

The technical and operational differences between the Internet and other communications networks, such as the PSTN are significant. The PSTN is a circuit-based connection-oriented infrastructure with centralized control structure, while the Internet is a packet-based connectionless infrastructure with minimal decentralized control structure, whereby fundamental differences exist between the PSTN and Internet for data, control and management. Addressing and numbering differences exist between a packet-based network and the PSTN as well. Every phone requires at least a physical address to control switching of the connection oriented infrastructure and often, a logical address. The PSTN relies on closed proprietary OSSs (Operational Support Systems), and NMSs (Network Management Systems), while the Internet does not have such a legacy nor does the Internet even require these systems.

Secure packet-based network communications are thus provided by the invention which cannot be obtained through the PSTN. To further security, the present invention preferably incorporates encryption-decryption along with its other security measures to assure that the contents of a communication are not readily readable. Encryption algorithms are well known in the art and are configured for interoperation with the present invention to further protect the privacy of data. Encrypting modems, and similar network interface devices, which incorporate encryption can also be utilized with the present invention to protect communications sent over public packet-based networks.

Still further, at least one embodiment of the present invention incorporates cryptography to protect data exchanges against accidental or malicious modification. It will be appreciated that such tampering can occur even if data is encrypted, since changes made to the ciphertext data stream will generally result in changes to the plaintext data produced by the decryption process.

To protect against tampering, keyed method authentication code (MAC) functions, such as HMAC, are utilized with at least one embodiment of the present system. These authentication functions are well known in the art. In cryptography, a message authentication code (MAC) is a short piece of information used to authenticate a message. A MAC algorithm, sometimes called a keyed (cryptographic) hash function, accepts as input a secret key and an arbitrary-length message to be authenticated, and outputs a MAC (sometimes known as a tag). The MAC value protects both the data integrity and authenticity of a message, by allowing those who possess the secret key (verifiers) to detect any changes to the message content.

Alternatively, data may be digitally signed, for example using an RSA algorithm. RSA stands for the last names: Ron Rivest, Adi Shamir and Leonard Adleman, who invented the technique. RSA is an algorithm for public-key cryptography based on factoring large integers. A user of RSA creates and then publishes the product of two large prime numbers, along with an auxiliary value, as their public key. The prime factors are kept secret. Anyone can use the public key to encrypt a message, but with currently published methods, if the public key is large enough, only someone with knowledge of the prime factors can feasibly decode the message.

Other security protocols exist, for example, Transport Layer Security (TLS) and its predecessor, Secure Sockets Layer (SSL), which are both used widely to protect transactions on the World Wide Web (Internet). These security mechanisms combine asymmetric (public-key) cryptography, symmetric (secret-key) cryptography, and MACs to securely select cryptographic algorithms for use, and handle other security issues. Several versions of the protocols are in widespread use in applications, such as web browsing, electronic mail, Internet faxing, instant messaging and voice-over-IP (VoIP).

It will be appreciated that many protocols and techniques exist which can be made to interoperate with the present invention to encrypt data and to protect data against tampering.

It should be noted that these security measures in themselves suffer from numerous shortcomings. For example, encrypting modems do not protect the identities of communicating parties, and thus fail to solve security and business requirements of many applications. In many cases it is as important to conceal from eavesdroppers the identities of the communicants as it is to protect the actual content of their communication. This problem cannot be solved by an end-user device since, for example, an eavesdropper can identify the recipient of a modem connection simply by observing the telephone number dialed by the party originating the call (e.g., by monitoring the DTMF tones generated by the transmitting telephone or modem), or intercepting IP addressing for an internet communication. Other networking protocols suffer from the same limitation that eavesdroppers can determine at least the identity of the intended recipient of data, even if the data is encrypted.

So although Internet-based systems for protecting anonymity of a user are known (e.g., remailers for PGP-encrypted electronic mail and anonymizers for World Wide Web communications), the techniques they employ do not provide the level of security required by many applications. As a result, individuals, companies and government agencies generally do not trust sending private communications over the Internet.

A second problem with systems known in the background art is that the cost of the development and manufacture of the secure hardware and programming must be recovered when users purchase the equipment. Since no after-purchase revenue is available to device manufacturers and vendors, customers are forced to make a substantial initial investment, often of several hundred dollars per user, to purchase the hardware and/or software. Many potential customers, such as companies with a large number of users who would all need to be equipped with the hardware, are deterred by this initial cost and ultimately select less expensive, albeit, less secure systems.

Consequently, a long felt need exists for a data communications system which is easy to use, reliable, fast, secure and economical for transmitting confidential or sensitive information expeditiously even to remote points over various digital packet-based communications networks.

The present invention establishes a connection to a remote network enabled computer device (e.g., PC), such as through an Ethernet connection or other form of networking hardware. The protocols of the invention operate to overlay a secure communications protocol upon the Internet Protocol (IP) suite. It will be appreciated that IP protocols comprise a set of communications protocols used for the Internet and other similar networks, and is also commonly known as TCP/IP which is the underlying protocol used for the Internet.

Conventional communications on the Internet are performed from one IP address to another IP address, passed from a sending IP address and intelligently routed through the network to the destination IP address. The destination IP address is thus passing over the network and detectable as packets are communicated from sender to receiver. However, the present invention utilizes a trusted intermediary server which intermediates between the two client systems, thus enhancing security.

Distinct ports are used by the communication protocols in the inventive system, so that the computer is able to handle the communications properly. To establish communications directly with the receiving PC, a private port is preferably utilized. However, modern computers utilize firewall security devices to prevent unsolicited communications on uncommon ports. The firewall intercepts the message and neither responds nor passes the message to the computer to process. This is commonly referred to as a closed port.

It is possible for a knowledgeable person with sufficient computer security privileges to open a private port, but this is difficult for the average user. This makes it problematic for an average user to establish point-to-point (peer-to-peer) communication between their computer and another computer.

However, the ports are only blocked on incoming messages, while outgoing messages are permitted on any port. The protocol for the present invention eliminates the need to open a private port for incoming messages. When a user wishes to receive messages, the user starts the client program, which sends a message to a trusted intermediary server. The server is referred to as the trusted intermediary server, as it utilizes mechanisms and protocols to facilitate the communication between parties and is a trusted server for both parties. The server exchanges information to determine if the user is a valid user using a combination of the user's account number and a privately shared key. For each client, the client and server communications link remains open. When a user wishes to send a message, the sender client sends a message to the server indicating the account number of the intended receiver. The server checks if the receiver client is connected. If the receiver client is connected, the sender client is instructed to proceed.

The sender and receiver clients send messages which are routed through the server as the trusted intermediary. The sender is never aware of the IP address of the receiver, and the receiver is never aware of the IP address of the sender. Only the trusted intermediary of the server knows the IP addresses of both the sender and receiver. The connection is anonymous to the users. The present invention protects the communication from numerous forms of attack, including being configured so that even the server of the trusted intermediary is unable to decrypt messages that pass through it.

Although the preferred embodiment of the invention protects communications exchanged through the Internet, and/or an intranet environment, alternate embodiments may be used to protect other telecommunications networks, and can operate in combination with other communication forms. In one sense the present invention utilizes dedicated hardware interoperating with a trusted intermediary server and communications programming to convert a public packet-cased network into a secure private network for the delivery of electronic information.

The hardware layer of the present invention comprises at least sender and recipient computer systems (e.g., personal computer system or other computer device), configured for access to the communications network. In at least one embodiment a communication device, typically a form of modem according to the invention, is connected at both the sender and recipient ends to allow establishing a connection through the server of the trusted intermediary over the network between the two parties. It should be appreciated that the server of the trusted intermediary, comprises one or more server devices, each of which has one or more clients, networked to achieve greater efficiency and/or capacity), for managing connections between the respective networked computers of the sender and recipient.

It should be appreciated that because of the functions performed by the trusted intermediary, the present invention allows the use of a wide range of networked computers as senders and receivers. By way of example and not limitation, these devices may comprise personal computers, workstations, cell phones, tablet computing devices, Point of Sale (POS) devices, integrated/embedded computer devices and other computer-enabled means of interfacing with the network communications service(s), and is equally applicable on any available operating system and its associated platform.

BRIEF DESCRIPTION OF THE SEVERAL VIEWS OF THE DRAWING(S)

The invention will be more fully understood by reference to the following drawings which are for illustrative purposes only:

FIG. 11 is a screen shot representation of a receive log screen according to an embodiment of the present invention.

FIG. 12 is a screen shot representation of a send log screen according to an embodiment of the present invention, showing command selections.

FIG. 13 is a screen shot representation of a send log according to an embodiment of the present invention, showing example contents of a send log.

DETAILED DESCRIPTION OF THE INVENTION

Figure 1:
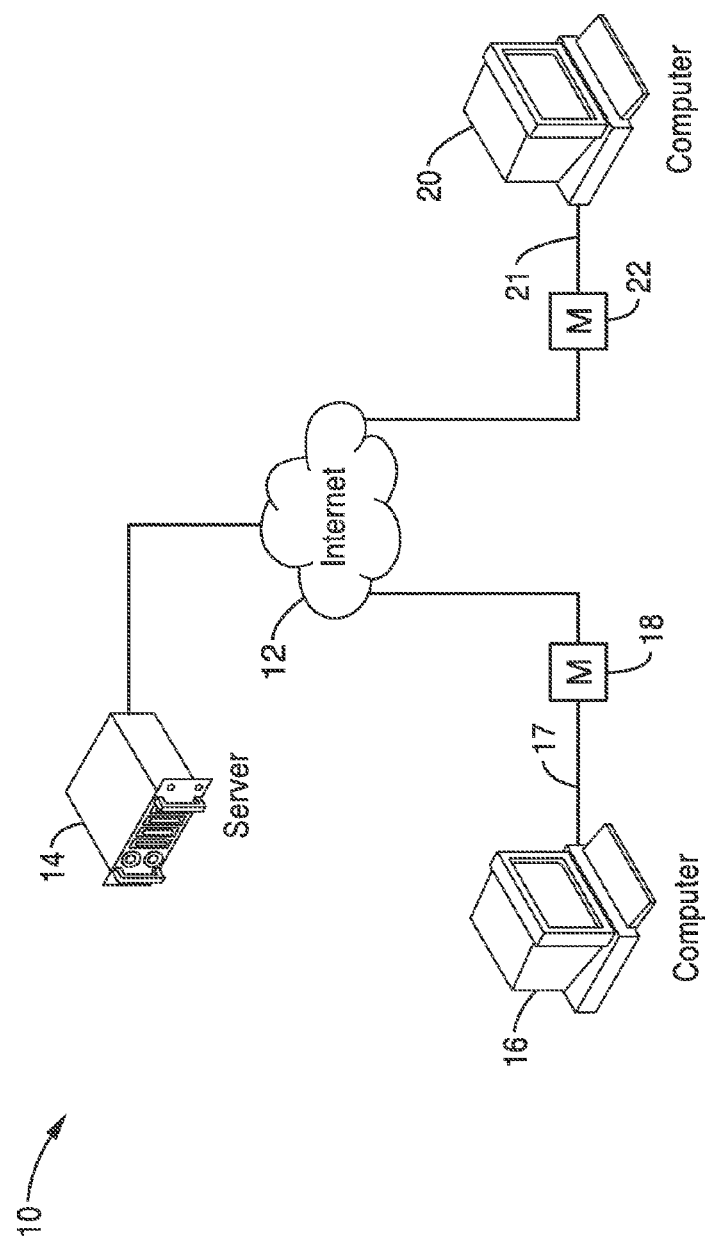
FIG. 1 is a block diagram of a secure communications system according to an embodiment of the present invention in which the Internet is used as the transport media.

FIG. 1 illustrates an example embodiment 10 of the present invention showing a trusted intermediary within server 14 operating on Internet 12 to provide a secure communication between computers 16, 20 through respective modems 18, 22. The modems 18, 22 are connected through lines 17, 21, preferably to private ports on the computers controlled by the present invention. The computers of this secure communications system may comprise personal computers, or workstations, or other devices with access to a packet network, such as the Internet.

A person seeking to make a secure exchange of data with a recipient selects the recipient on an appropriate menu, discussed hereinafter, which causes the sender computer device 16 to connect on private port line 17 through modem 18 and through network 12 to server 14 in which trusted intermediary programming is executed. The trusted intermediary 14 both validates the identity of the recipient's account and authorizes a connection to the recipient. After appropriate handshaking and authentication, discussed in greater detail hereinafter, the trusted intermediary disconnects from the call and the data is transferred from sender computer 16 to recipient 20.

In at least one implementation of the system, the trusted intermediary server could be operated by a third-party seller of secure communication services. This third-party preferably provides downloadable application programs for executing sender-receiver functionality on the client computers which preferably operate through private ports of these computer devices to interface directly with the trusted intermediary server, or another device, such as an email server, which in turn interfaces with the trusted intermediary server. Alternatively, the trusted intermediary server may be maintained at different locations of a corporate entity to assure its secure communications. The above scenarios are provided by way of example, and not limitation; as the trusted intermediary server may be maintained in any manner desired.

Although the hardware comprising the general system have been described above, many of the critical functions are performed in its programming. In particular, programming functions are critical at an application running at both the sender and receiver (e.g., PC layer), and separately at the trusted intermediary server.

Figure 2:
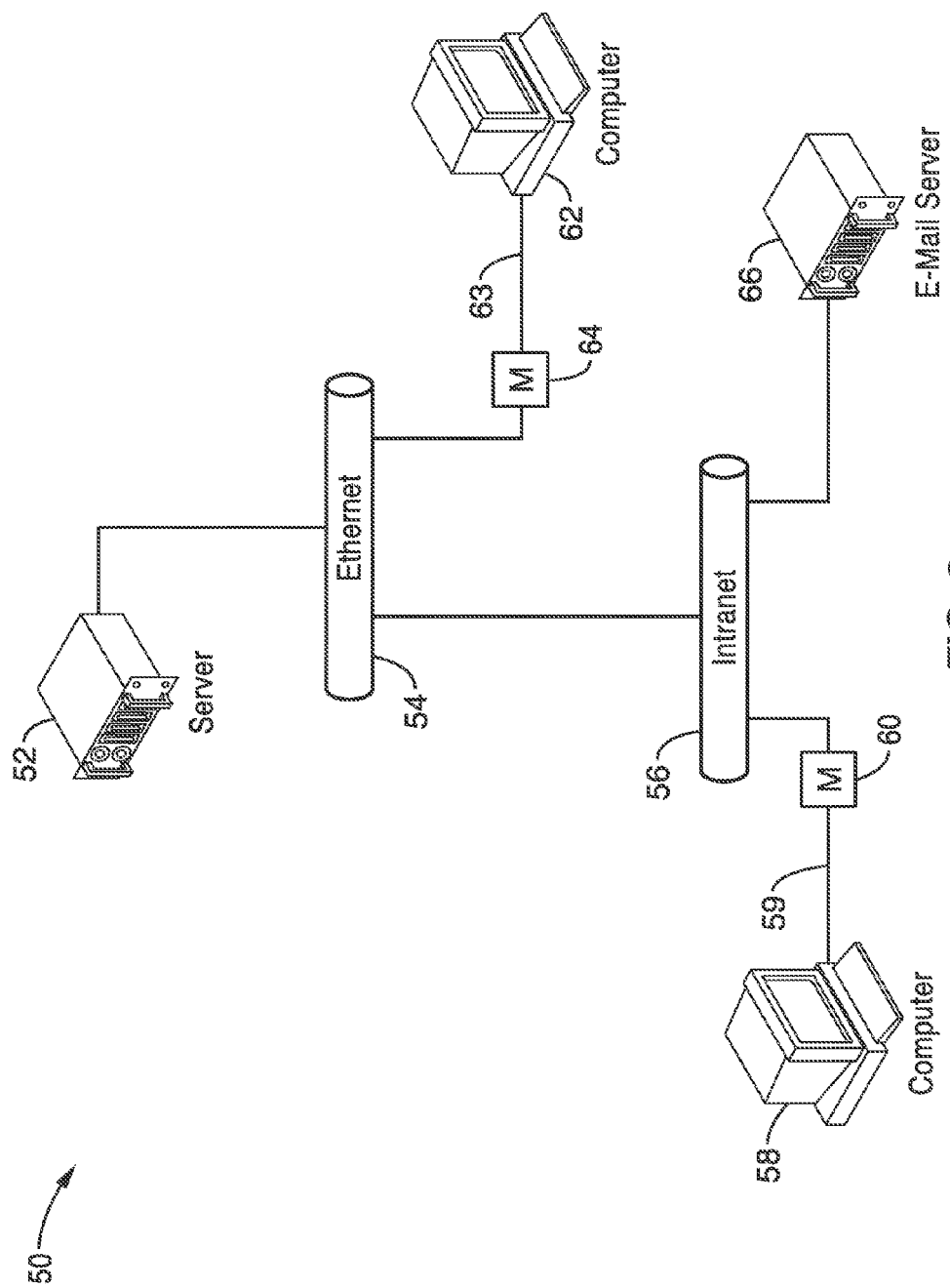
FIG. 2 is a block diagram of a secure communications system according to an embodiment of the present invention with an existing electronic mail (email) client being utilized as the primary user interface.

FIG. 2 is a block diagram similar to FIG. 1, illustrating an example embodiment 50 of the present invention showing a trusted intermediary operating as server 52 (which may comprise multiple servers), intermediating between a first network depicted as utilizing Ethernet 54 (e.g., a wide area network, which could be part of the Internet), and a second network depicted as an intranet (e.g., a local area network) 56. This network provides a secure communication between computers 58 on the second network, preferably through private port connection 59 and modem 60, and computer 62 on the first network, through private port connection 63 and modem 64. An electronic mail (email) server 66 is also shown coupled to the intranet being utilized as the primary user interface between the sender and receiver and the trusted intermediary server.

The server in FIG. 2 describes a particular embodiment of the current invention, which emphasizes the connections through trusted intermediary server 52, with the rolls of the Internet, intranet and email server clearly shown. For the sake of simplicity, the second communication channel is not shown in this figure.

One of ordinary skill in the art will appreciate that the server functionality of the trusted intermediary server can be implemented in a "cloud" computing environment. The above embodiment has files transferred to a "cloud" and/or is particularly well suited for implementation in a "Software as a Service" (SaaS) computer environment. As meant herein, cloud computing refers to delivery of computing and/or storage capacity as a service to a heterogeneous community of end-recipients. Cloud computing entrusts services with user data, software and computation over a network. Three basic types of cloud computing are recognized: infrastructure as a service (IaaS), platform as a service (PaaS), and software as a service (SaaS).

It will be appreciated that SaaS characteristics generally include network-based access to, and management of, commercially available software which is managed from central locations rather than at each customer site, enabling customers to access applications remotely through the Internet. Application delivery typically is a one-to-many model, as opposed to a one-to-one model. One of the primary characteristics of this model is the ability to offer the most current version of those applications offered, eliminating the need for end-users to download patches and upgrades.

Referring to the figure, a first computer 58 sends messages to its corporate email system which resides on email server 66 through the company intranet 56. A program that interfaces to the email system takes the email messages intended for a secure address and manages a secure transfer of the message from email server 66 to computer 62 through trusted intermediary server 52. In this scenario the application programming which operated at the sender/receiver in FIG. 1, is configured for operation in the local email server to interoperate with the programming of the trusted intermediary to provide secure communication through the trusted intermediary. It should be appreciated that the secure data transfer portion of the message sending can be performed using the same general process described in regard to FIG. 1. The user of computer 62 would not be able to tell that the message originated from an email message. If the message were sent in the opposite direction, the user of computer 58 would receive the message as an email message. Within this same implementation, both users could be interacting through their own separate corporate email systems.

A further implementation can be configured to allow the files to reside on a secure file server in an encrypted form. The files can thus be retained in a directory structure on the file server to allow for separation of the files, such as by project or similar distinctions. When a user needs a file, the file is requested, the key transfer is performed to give the user the encryption key, the file is transferred, and the file is decrypted. Multiple users can access the same file. This implementation only requires minor change(s) in the described protocols used by the system, such as substituting a request command for a send command, as appropriate, while retaining the same underlying mechanisms.

It should be noted that the secure communication is performed interoperably between three parties in view of the intermediation of the trusted intermediary, and not just communication between a sender and receiver. The trusted intermediary server does not drop out of the process as the communication progresses. Although the communication process is being performed over the Internet, another (second) communication path is established (seen in FIG. 5C) for communicating secure key, such as a string X, used in the confirmation process. This secure key communication can be performed prior to, or during, the communication through the intermediary using the first communication path. It is most preferable that this secure key communication be over a different medium, than the packet-based network, to increase security. In one preferred embodiment, this communication is performed over a public-switched telephone network (PSTN), cellular network, instant messaging path, or other second communications path. Using a different channel, and preferably even a different medium of exchange, increases security as it would be very unlikely for a hacker to have access to both media at the time of transmission and recognize the correspondence thereof as utilized during the secure communications. The server, however, continues to intermediate the transmissions (seen in FIG. 6A through FIG. 6C), forwarding handshake and encrypted files and packets in both directions. Even someone with access at the server location would not be able to decrypt the information sent between sender and receiver (in one or both directions) because of the secure key being sent on the separate and distinct communications path.

Although generally providing less security, at least one embodiment of the present invention is configured for using a separate network session as the second communication link. It will be appreciated that a session is a semi-permanent interactive information interchange, between the sender and receiver devices, or vice-versa, and is set up at given point in time, and torn down at another given time. An established communication session may involve more than one message in each direction. A second session is thus typically, temporally displaced, from said first session, although it can be spatially displaced, traversing a different path or different equipment between the sender and receiver.

Figure 3:
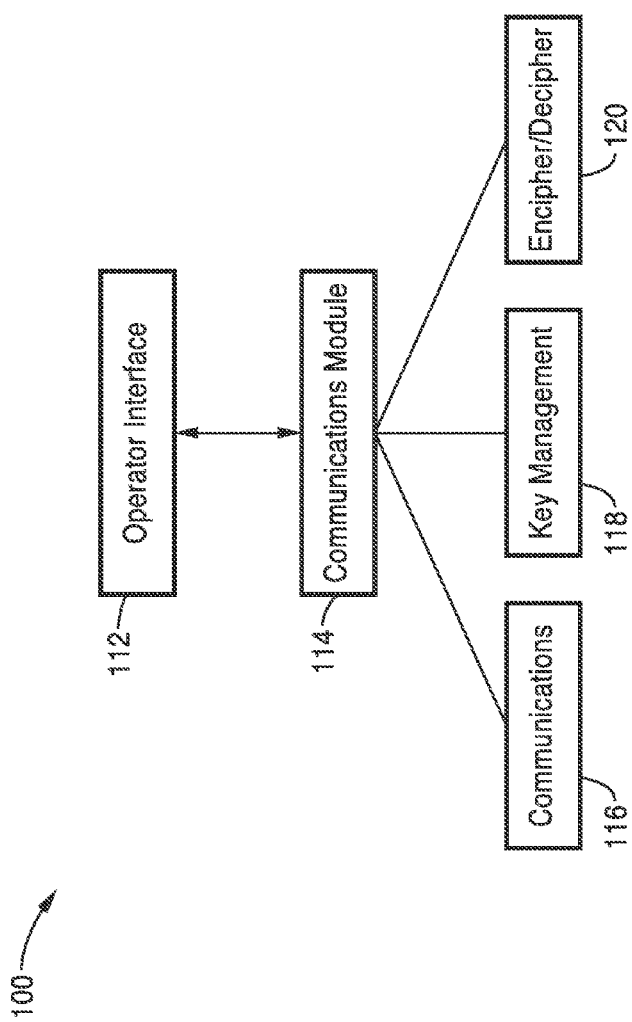
FIG. 3 is a block diagram of a communications transport layer according to an embodiment of the present invention.

FIG. 3 illustrates an example embodiment 100 of a communications transport layer utilized according to the invention at the sender/recipient computer level. The programming functions of the transport layer preferably comprise an operator interface 112 which communicates bidirectionally with a communications module 114 which is configured with submodule 116 to perform communications, submodule 118 to perform key management, and submodule 120 to perform enciphering and deciphering functions. In an exemplary embodiment, the communications sub-module 116 provides a connection between a sender/recipient computer device and the trusted intermediary server through the Internet, a private Intranet, or a combination thereof. The key management submodule 118 manages the enciphering/deciphering keys required for data transfers. The enciphering/deciphering submodule 120 coordinates encryption and decryption, as appropriate, of the data being transferred. It will be appreciated that for the sake of compatibility the present invention may share nomenclature for certain interfaces and high level structures with previous secure communications devices of the inventor.

The Internet and intranet implementations shown in FIG. 1 and FIG. 2 can provide similar high level functionality. Successful completion of a data transfer between two sender/receiver computers requires the completion of three protocols as seen in FIG. 3 with the communications module 116 utilizing a call manager protocol, a key management block 118 using a key exchange protocol, and an enciphering/deciphering block 120 using a data exchange protocol.

In general, the call manager protocol manages the process by which a sender, through a computer (e.g., personal computer (PC)) and a packet network link, is identified to the trusted intermediary server, and also identifies the recipient of the network communication —each by unique account numbers, in the exemplary embodiment described herein. Referring back to FIG. 1, the sender computer 16 opens a communications channel to the server 14 acting as a trusted intermediary, identifying itself and the recipient. If both account numbers are valid, the sender and recipient are connected through server 14 to permit the respective computers 16, 20 to exchange data. At the same time, server 12 logs the secure communication session for billing purposes. For example, the trusted intermediary server can capture the connections made and the time of the session and/or amount of data transferred in the session.

Figure 4A:
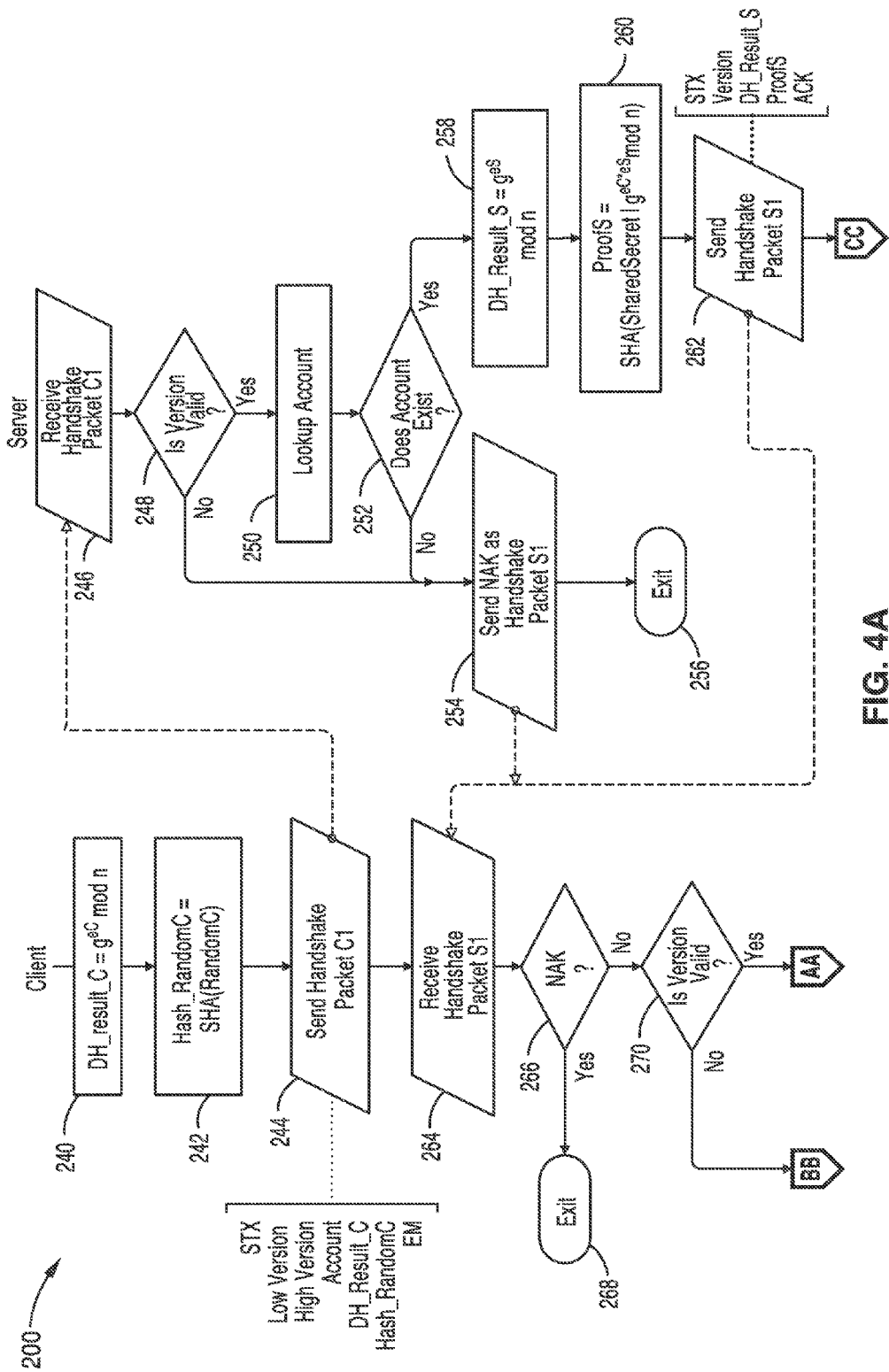
FIG. 4A and FIG. 4B is a flowchart of a call manager protocol according to an embodiment of the present invention utilizing the Internet as the transport media.
Figure 4B:
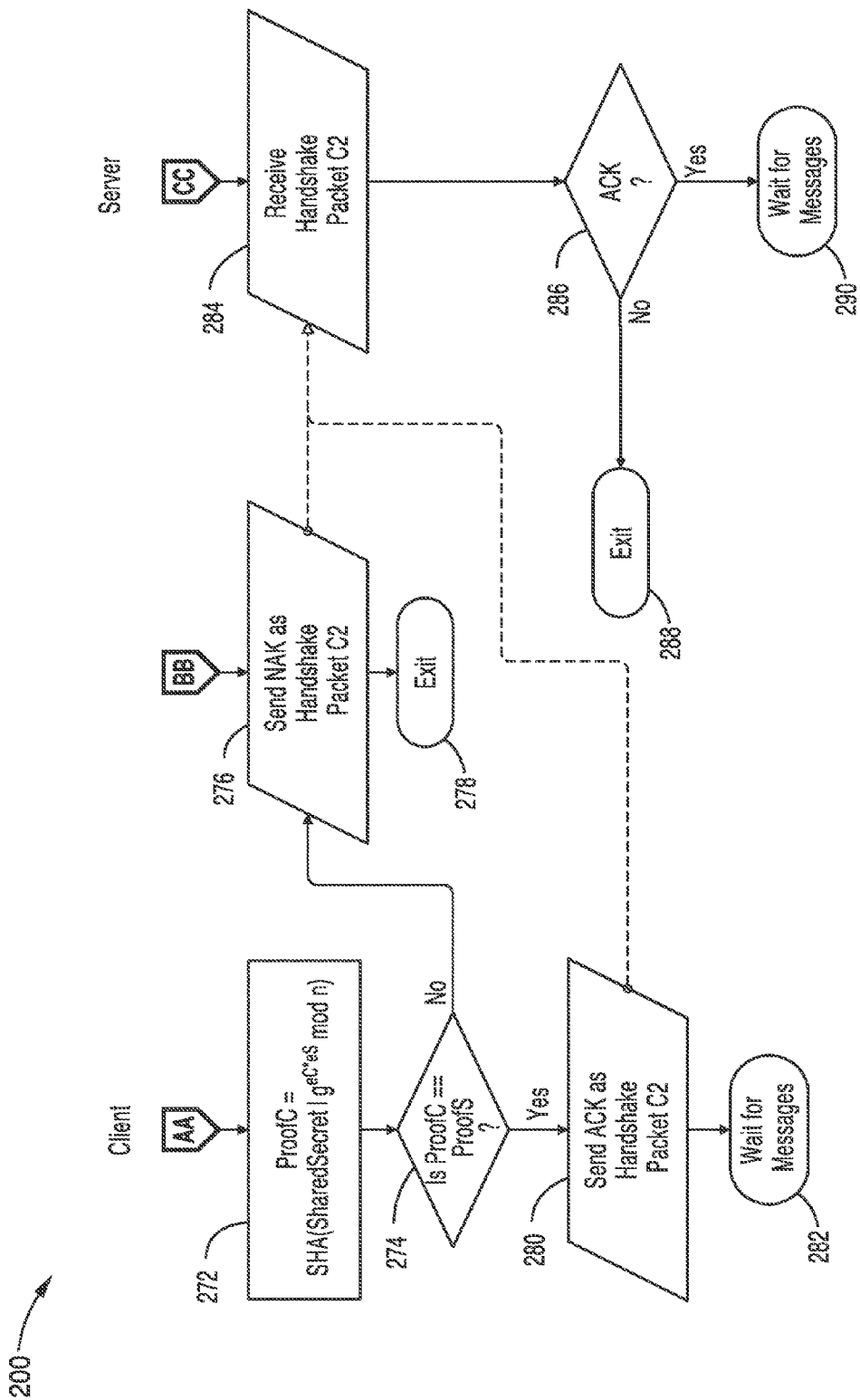

FIG. 4A and FIG. 4B illustrate an example embodiment 200 of a secure communication manager protocol of the present invention. Those skilled in the art will recognize that the steps represented in all the flowcharts described herein have been simplified for the sake of simplicity of illustration, including the elimination of time outs and internal testing for data integrity. Data flow between the sender and recipient is represented in the flowcharts by a dashed line. For convenience, the "trusted intermediary server" is generally referred to in the following sections as simply, "the server".

The sender and receiver described in the present invention comprise client devices, distinct from the server of the trusted intermediary, while operating in a client-server relationship with the trusted intermediary. In another sense both sender and receiver are clients using the secure communication provided by the trusted intermediary. For simplicity of illustration, the flowcharts often refer to interaction between a client device, meaning sender and/or receiver depending on context, and the server (trusted intermediary server).

The protocol begins at step 240 with a sender generating an appropriately secure key, for example a Diffie-Hellman random exponent eC and computing the related value geC mod n, where g and n are fixed system-wide parameters.

In an exemplary embodiment, the sender also generates at step 242, a 20-byte pseudorandom value, RandomC. Then, at step 244, the sender transmits a first handshake packet, Handshake Packet C1, which is received by the server at step 246. In at least one embodiment, the first handshake packet sent by the sender includes the STX field for framing, sender version information (e.g., range of versions supported from low version field to high version field), account number, geC mod n, and a hash_RandomC. Table 1 shows a representative example of a data structure that could be utilized.

The handshake session must be successfully completed to exchange keys or transfer data. If, as determined at step 248, the server cannot support the version transmitted by the client, server execution branches to step 254 to transmit a Negative Acknowledge (NAK) signal and to exit 256. In this case, the Client will receive the Negative Acknowledge (NAK) at 264, with the NAK detected at step 266 and resulting in an exit 268.

Generally, however, the version is valid and found to be so at step 248. In this circumstance, the server finds the client record in a database at step 250. If, as determined at step 252, the client record is invalid, the server branches to step 254 to transmit a Negative Acknowledge (NAK) signal and exit 256. In this case, the client receives the NAK at 264, which after a check for NAK at 266, results in an exit at step 268.

Generally, however, the client record will be found valid at step 252, with the recipient developing its responsive handshake packet, Handshake Packet S1, at step 258 and 260, in which it DH_Result_S=$g^{es}$ mod n, and ProofS=SHA (SharedSecret|$g^{eC*eS}$ mod n). Table 2 illustrates an example data structure of this recipient response handshake packet. The SharedSecret is a code that has been assigned to the client as supplied by some external means. The SecretCode is retained by the server and not readily available to the user. In at least one embodiment, this data is kept in an external device.

The packet is then transmitted by the server at step 262 and received by the client at step 264. The version specified by the server handshake packet is checked at step 270, and the client responds to a failure with a Negative Acknowledge (NAK) at step 276 (FIG. 4B) and exits at step 278. Generally the version will be supported, whereby the check at step 270 is affirmative, and the process advances with the Client performing a proof step at step 272. At step 274, the result of the proof step is then compared to the ProofS portion of the Handshake Packet S1. A negative result forwards to step 276, 278 for an exit, while a successful check causes the client to generate a second handshake packet, Handshake Packet A2, at step 280 which is transmitted to the server, and the client then awaits messages at step 282. The server receives Handshake Packet C2 at step 284. If a Negative Acknowledge (NAK) is sent at step 276, it is detected at step 286 and the server exits 288 from the connection. Otherwise, the client and server now have an open connection through which messages can be sent and the server awaits messages 290. Once the call has connected to the server according to the invention, the other two protocols may be used.

Figure 5A:
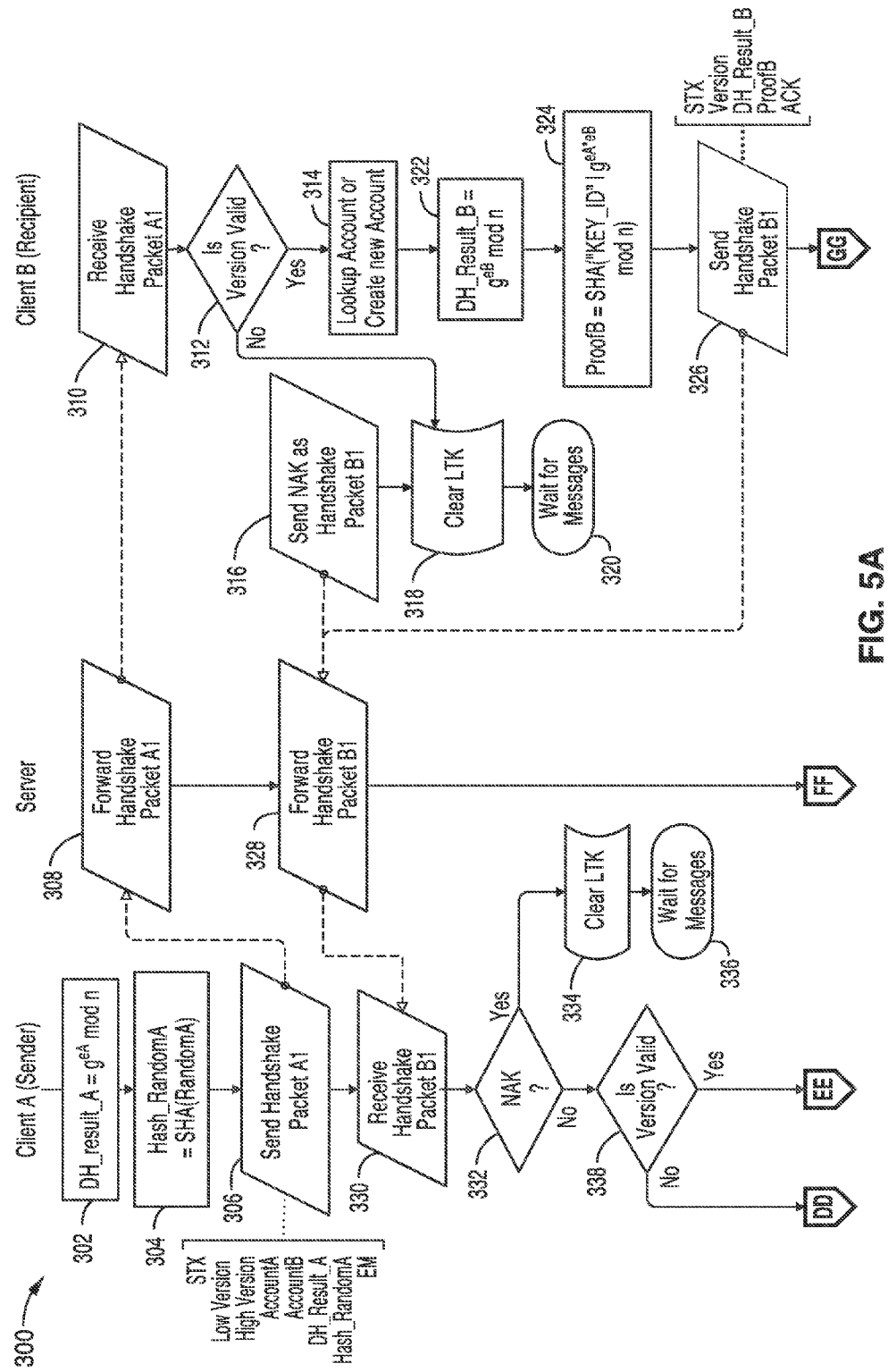
FIG. 5A through FIG. 5C is a flowchart of a key exchange protocol by which keys are exchanged between sender and receiver according to an embodiment of the present invention utilizing the Internet as the transport media.
Figure 5B:
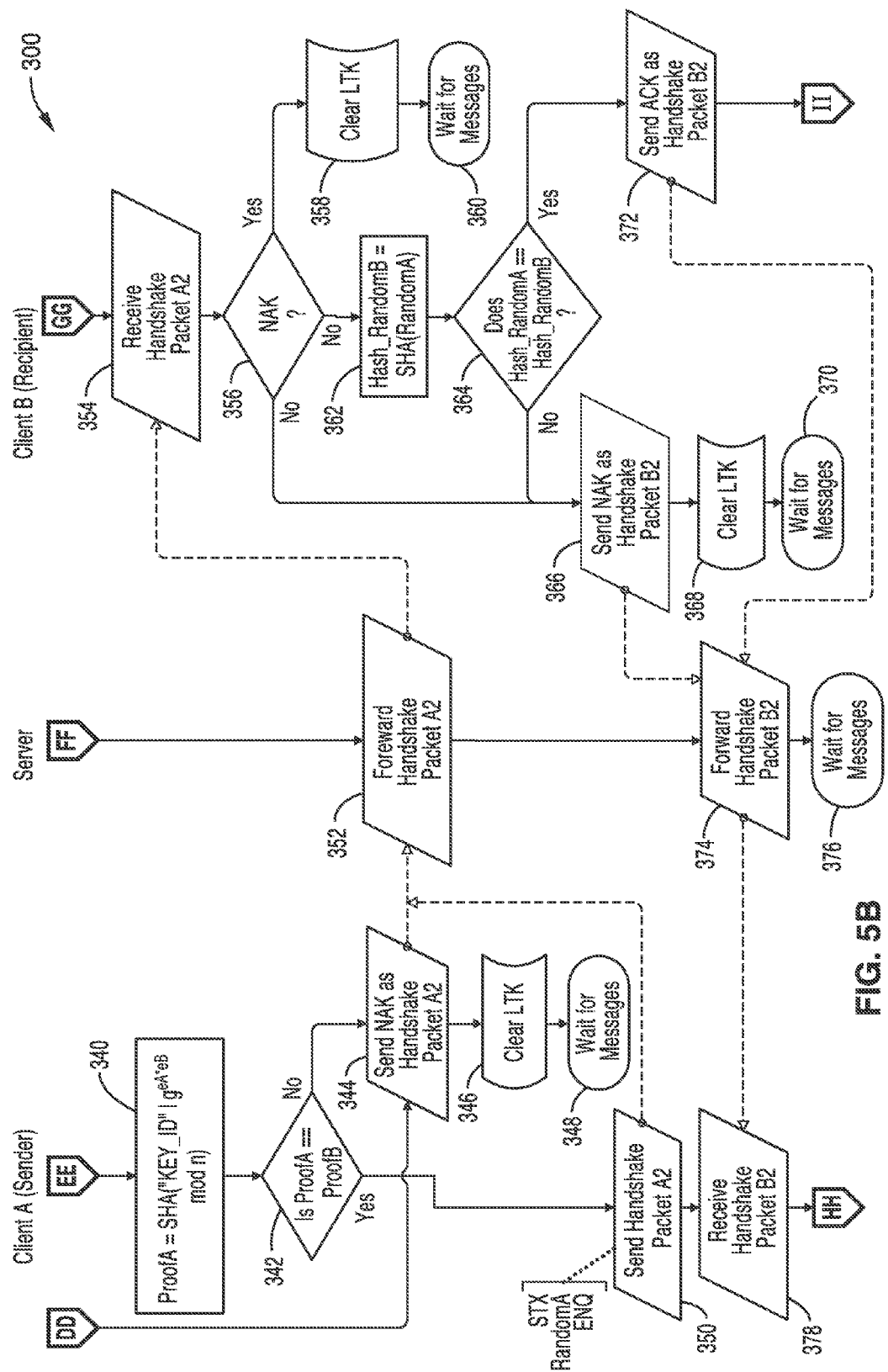
Figure 5C:
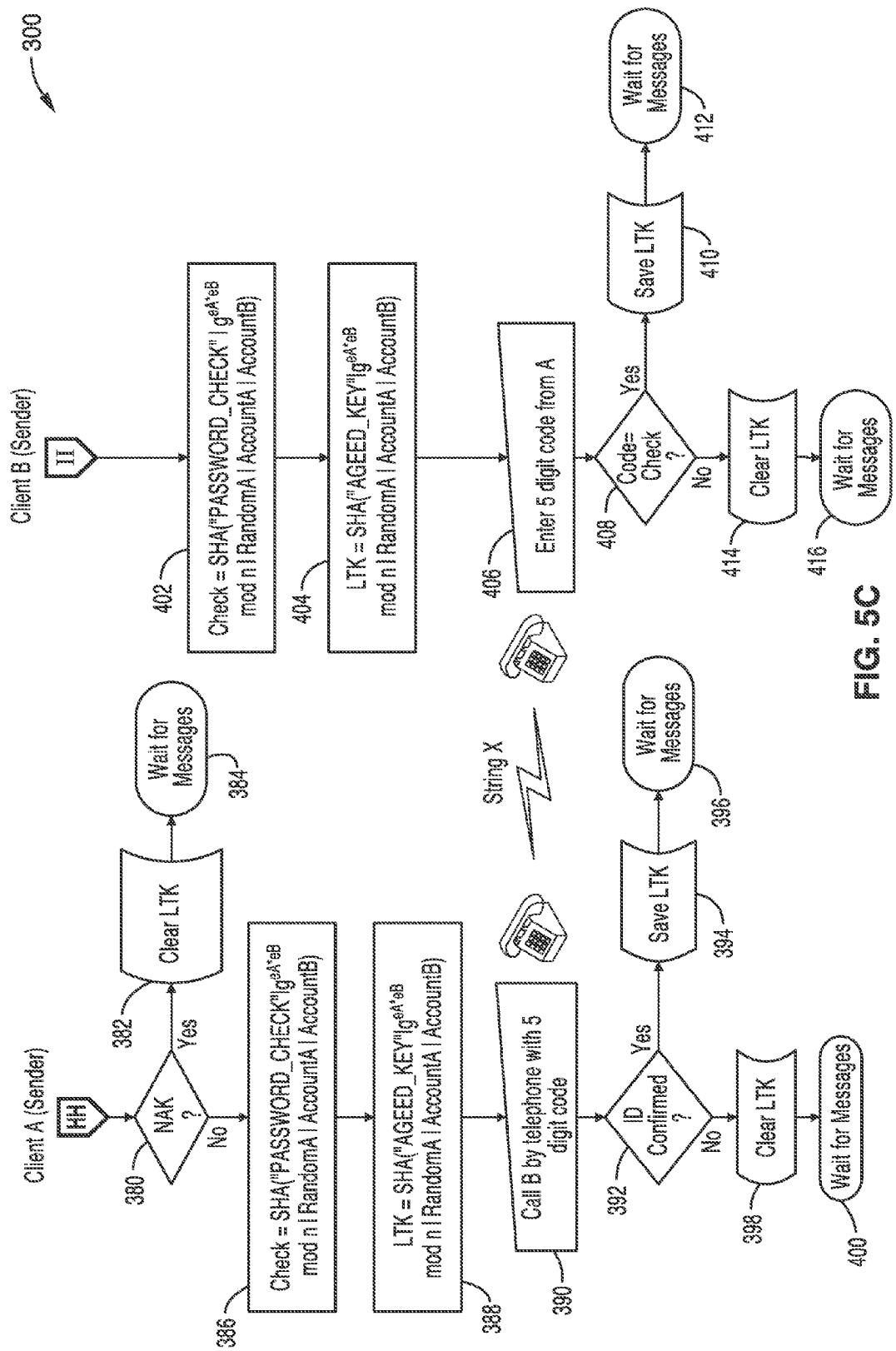

FIG. 5A through FIG. 5C illustrate an example embodiment 300 of the key exchange protocol, by which sender and recipient (receiver) clients exchange long term keys through a handshaking process. Data flow between the sender and recipient is shown by a dashed line, and it is assumed that the communications link has been established by both client computer devices to the server of the trusted intermediary. Therefore, the logic associated for testing that functionality is not shown. The server responds with a NAK to the sender client when the receiver client is not available. The key exchange need only be performed once between each pair of senders and receivers although it may be performed as often as desired. This long term key is used to create a session key during the Data Exchange protocol.

At step 302 of the protocol, the sender generates an appropriately secure key, for example a Diffie-Hellman random exponent eA and computes the related value geA mod n, where g and n are fixed system-wide parameters. The sender also generates, in an exemplary embodiment, a 20-byte pseudorandom value, RandomA and a hash of the random number at step 304. Then, at step 306, the sender initiates a handshake session by sending a first handshake packet, Handshake Packet A1. This first handshake packet sent by the sender preferably includes the version information of the sender, account number, geA mod n, and a hash of RandomA. Table 3 represents an example data structure of this first handshake packet sent by the sender. Handshake Packet A1 is viewed by the server in step 308 to allow it to connect to the appropriate recipient. The server passes Handshake Packet A1 to the recipient without any modification, and the recipient accepts the packet in step 310.

Once the handshake session has commenced, the key exchange must be completed before data can be transferred. If, as determined at step 312, the recipient cannot support the version transmitted by the sender, the recipient will transmit a NAK message to the sender at step 316 as well as causing a clearing of the Long Term Key (LTK) at step 318 and then entering the wait for messages state 320. The packet is received by the server at step 328 and forwarded to the sender. If the sender receives the Negative Acknowledge (NAK) signal at step 330, then in response to the NAK check at step 332, the LTK is cleared at step 334 and the wait state for messages is entered 336.

Generally, however, the version will check as valid at step 312. In this circumstance, the recipient looks up the sender account at step 314. If no account record exists, a new sender account will be created.

The recipient develops its responsive handshake packet, Handshake Packet B1, at step 322 and step 324, in which it sets DH_Result_B=$g^{eB}$ mod n, and ProofB=SHA ("KEY_ID"|$g^{eA*eB}$ mod n). Table 4 illustrates an example embodiment of this responsive handshake packet data structure. The KEY_ID string represents, in an exemplary embodiment, a six-byte string, typically with no terminating byte.

The recipient handshake packet is then transmitted to the sender at step 326, and the sender receives the packet at step 330. Once a negative check for NAK occurs at step 332, the version specified by the recipient handshake packet is checked at step 338. If the sender cannot support the version transmitted by the recipient, the sender transmits a NAK message to the recipient at step 344 (FIG. 5B) as well as causing a clearing of the Long Term Key (LTK) at step 346 and then entering the wait for messages state 348. The NAK message is received by the server at step 352 and forwarded to the recipient. The recipient receives the NAK message at step 354, which is detected at the check 356, upon which the LTK is cleared at step 358 and a wait state for messages entered at step 360.

Generally, the version will be supported whereby the result of the check at step 338 (FIG. 5A) is affirmative, and the process advances with the sender performing a proof step at step 340 (FIG. 5B), with ProofA=SHA("KEY_ID"|$g^{eA*eB}$ mod n).

At step 342, the result of the proof step is then compared to the ProofB portion of the recipient handshake packet, Handshake Packet B1. If the proof does not match, the sender transmits a NAK message to the recipient at step 344, clears the Long Term Key (LTK) at step 346, and enters the wait for messages state 348. The NAK message is received by the server at step 352 and forwarded to the recipient. The recipient receives the NAK message at step 354, the NAK is detected at step 356, and in response to this it clears the LTK at step 358 and enters wait for messages state 360.

Generally the proof matches and in response to which the sender generates a second handshake packet, Handshake Packet A2, at step 350 and transmits it to the server. The Server receives the packet at step 352 and forwards the packet to the recipient. The recipient receives the packet at step 354. The check at step 356 has previously been noted.

Then, at step 362, a hash is calculated from the received RandomA from Receive Handshake Packet A2. A comparison is then made between the received Hash_RandomA and the calculated Hash_RandomB at step 364. If, as determined at step 364, the compare fails, the recipient will transmit a NAK message to the sender at step 366 as well as cause a clearing of the Long Term Key (LTK) at step 368 and enter the wait for messages state 370. The packet is received by the server at step 374 and forwarded to the sender, whereafter the server awaits messages 376. The sender receives the Negative Acknowledge (NAK) signal at step 378 resulting in the check at step 380 and clearing the LTK at step 382 (FIG. 5C) and entering the wait for messages state 384.

Generally, the hash compare at step 364 (FIG. 5B) succeeds and the receiver sends an Acknowledge message (ACK) at step 372. The packet is received by the server at step 374 and forwarded to the sender, after which the server awaits messages 376. The sender receives the Acknowledge message (ACK) at step 378 resulting in the sender calculating a password check at step 386 (FIG. 5C), with Check=SHA ("PASSWORD_CHECK"|$g^{eA*eB}$ mod n| RandomA|AccountA|AccountB). At the same time, the receiver makes the same calculation at step 402. The result is the generation of an ordered string of numbers which are then reduced to form, in an exemplary embodiment, a character string X. An additional calculation is performed by the sender at step 388 with LTK=SHA("AGREED_KEY"|$g^{eA*eB}$ mod n|RandomA|AccountA|AccountB). This is also performed at the receiver at step 404 to create a long term key (LTK) at both the sender and recipient sides.

At step 390, the string X is then displayed as a pop-up window at the sender side (seen in FIG. 9) and the sender is instructed to contact the recipient by a secondary communication medium, for example by telephone, to provide the string X. At step 406, on the recipient side, shown in FIG. 5C, the recipient is instructed to await said call from the sender and to insert the string X. If the ID is confirmed, as checked at step 392 on the sender side and step 408 on the recipient side, the Long Term Key (LTK) is saved at steps 394 and 410, respectively, followed by entering the wait for messages state 396, 412. If the check at steps 392 and 408 result in a negative compare, the Long Term Key (LTK) is cleared in steps 398 and 414, respectively, and both sender and recipient enter the wait for messages state 400 and 416, respectively.

At this point, if the protocol has executed successfully, both the sender and receiver have saved the Long Term Key (LTK) and have established in their respective account listings that the sender/recipient pair is authorized to transfer data.

Figure 6A:
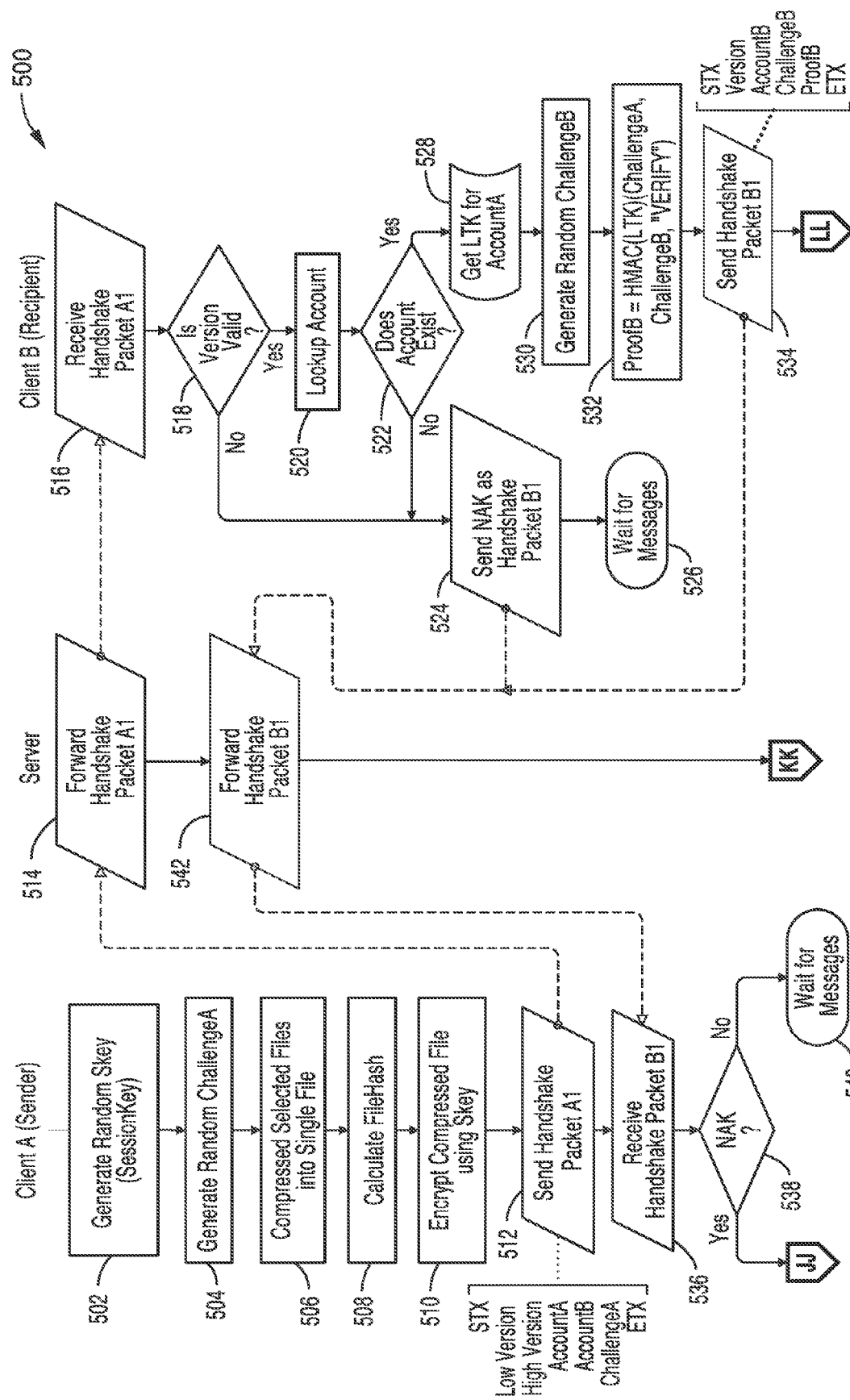
FIG. 6A through FIG. 6C is a flowchart of a data exchange protocol by which a file transfer is made between sender and receiver according to an embodiment of the present invention utilizing the Internet as the transport media.
Figure 6B:
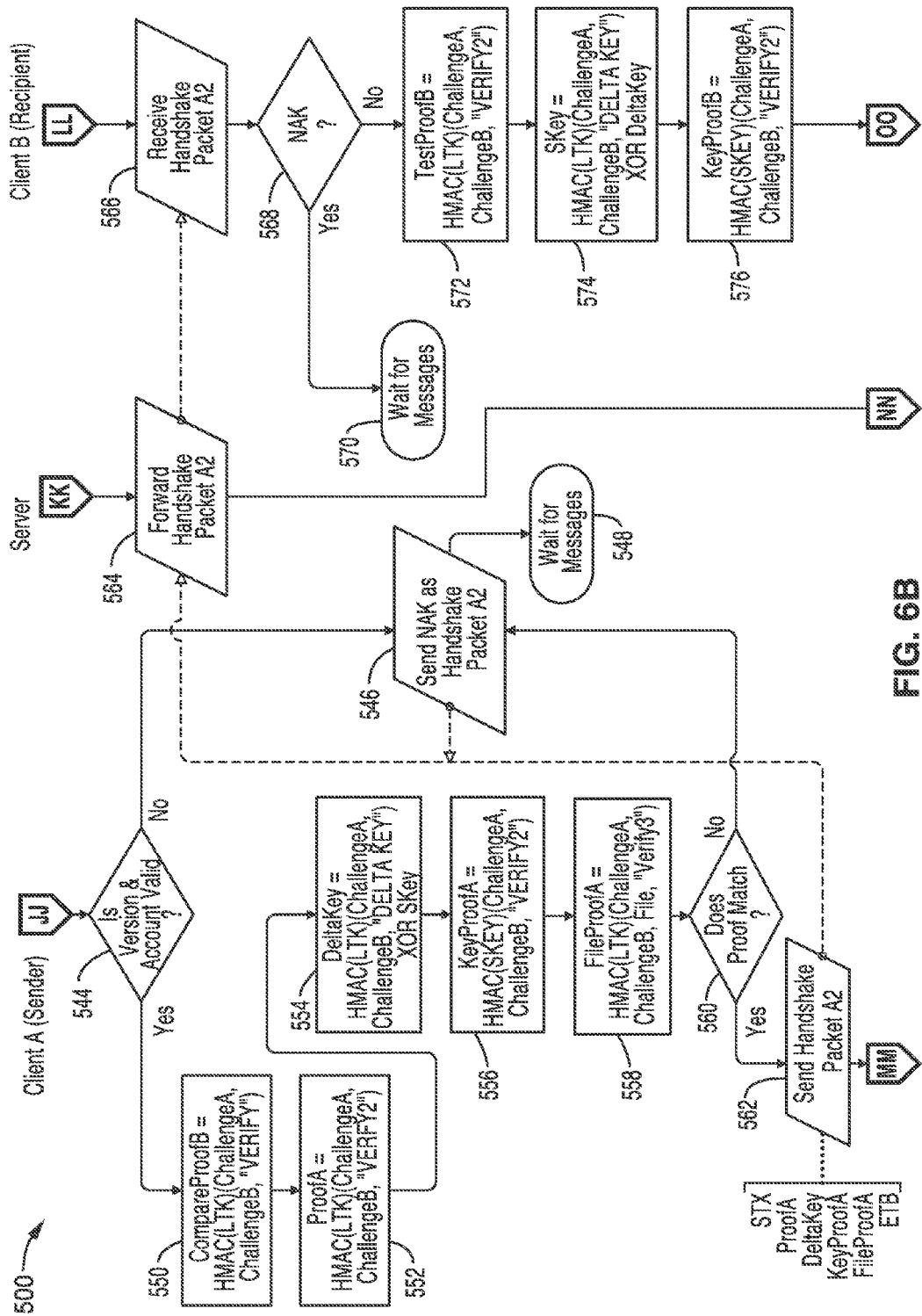
Figure 6C:
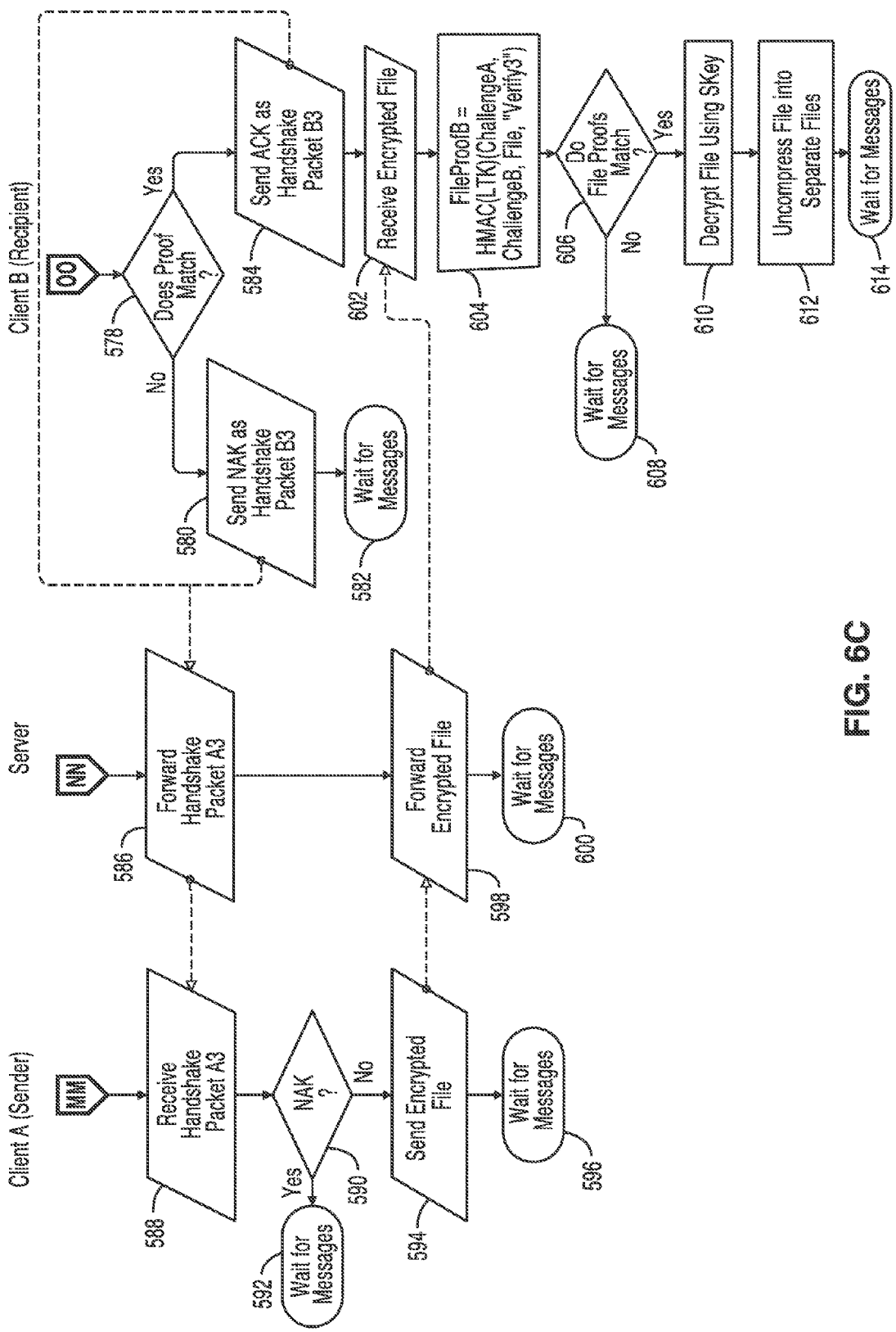

FIG. 6A through FIG. 6C illustrate an example embodiment 500 of a data exchange protocol of the invention performed after key exchange. Data flow between the sender and recipient is shown by a dashed line, and it is assumed that the communications link has been established by both client computer devices to the server of the trusted intermediary. Step 502 depicts the sender generating a random session key (SKey), which in at least one exemplary embodiment is on the order of 20 bytes. A random challenge is generated in step 504. The challenge in at least one exemplary embodiment is on the order of 20 bytes.

Figure 7:
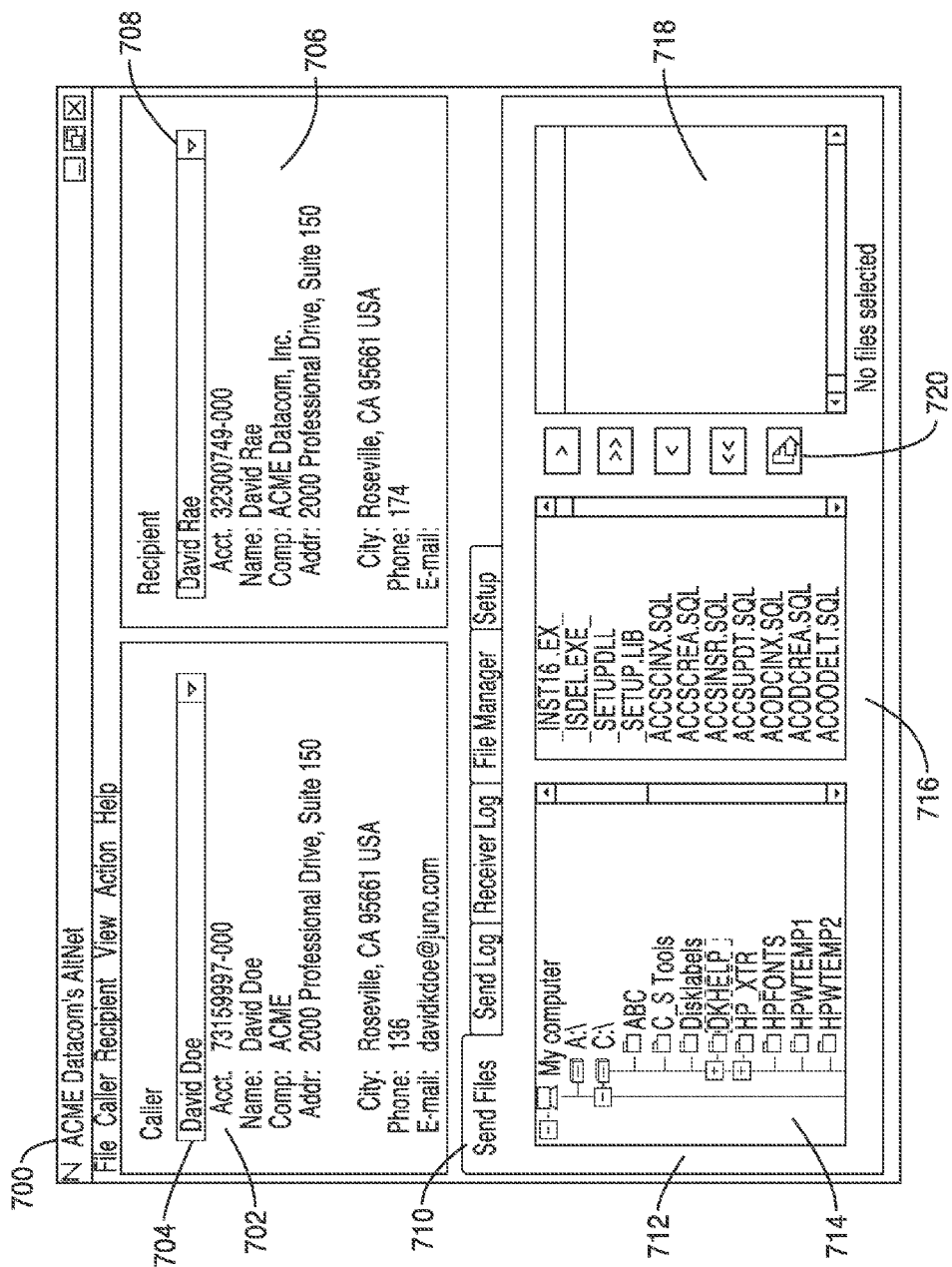
FIG. 7 is a screen shot representation of selecting files to send to a recipient according to an embodiment of the present invention.
Figure 8:
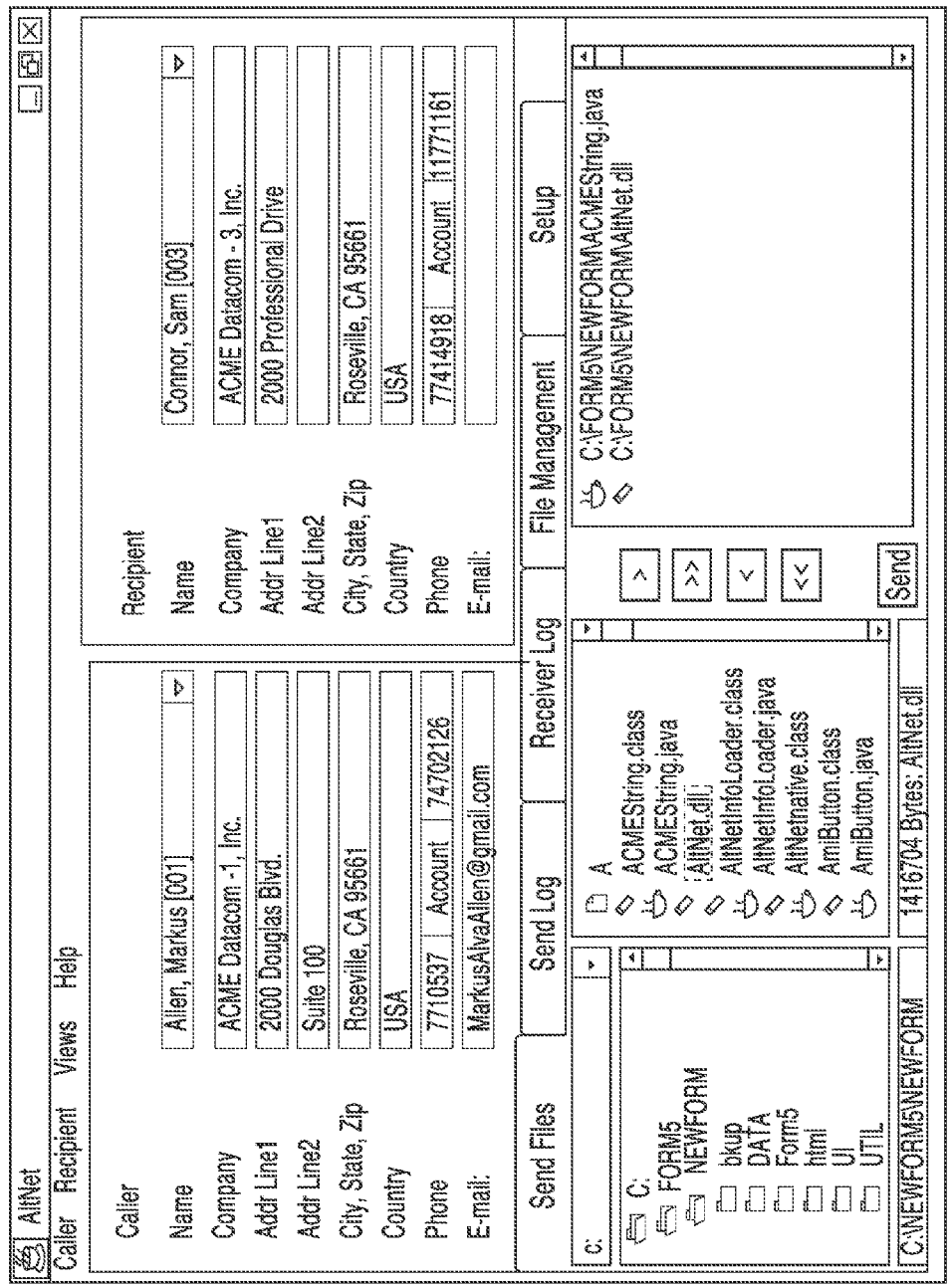
FIG. 8 is a screen shot representation of selecting files for transfer to the recipient according to an embodiment of the present invention, in which two files have been selected for sending.

The process then proceeds to step 506 with the compression of the files to be transferred (selection shown in FIG. 7 and FIG. 8). At step 508, a FileHash is calculated, such as in accordance with HMAC{SKey}("File_Check"|file) and appended to the compressed file, after which the compressed file, with the appended hash, is encrypted in step 510. In at least one example embodiment, the encryption is performed using triple DES, in encrypt-decrypt-encrypt mode. Block chaining using CBC mode is then performed, external to the DES operations. The first, second and third 56-bit DES keys are taken as the left-hand 64 bits of HMAC{SKey}("KEY1", MAC{SKey}("KEY22") and HMAC{SKey}(UKEY333"), respectively. Each 64-bit DES key typically contains fifty-six effective key bits, with the rest of the bits ignored as parity.

The HMAC and encryption are typically performed as a single pass, with file date and time preferably preserved. Once the encryption is complete, the sender then transmits at step 512 a Transfer Packet A1 to the server. Table 5 shows an example embodiment of this data structure. It should be appreciated that the mode of encryption-decryption described above is by way of example and not limitation as a number of different alternatives can be selected without departing from the teachings of the present invention.

The server receives the packet at 514, determines the recipient, and forwards the packet to the recipient, which receives the packet at step 516. If the recipient cannot support the version transmitted by the sender, as determined at step 518, the recipient transmits a NAK message at step 524 and enters the wait for messages state 526. The packet is received by the server at step 542 and forwarded to the sender, which receives the handshake packet at step 536 which is determined at step 538 to be a Negative Acknowledge (NAK) signal, whereafter the wait state for messages 540 is entered.

The version is typically determined at step 518 to be acceptable, after which the recipient performs a database lookup at step 520. The existence and presence of a Long Term Key for the account is checked at step 522. If either account condition fails, the recipient transmits a NAK message 524 and enters the wait for messages state 526. The packet is received by the server at step 542 and forwarded to the sender. The sender receives the Negative Acknowledge (NAK) signal at step 536 as determined at step 538 and enters the wait for messages state 540.

However, if the version and account number is valid as determined at step 522 the recipient gets the LTK for the account at step 528. At step 530 the recipient generates its own random ChallengeB, and calculates ProofB=HMAC{LTK}(ChallengeA|ChaliengeB|"VERIFY") at step 532. The recipient then sends 534 its own transfer packet, Transfer Packet B1, to the server. Table 6 depicts an example embodiment of this recipient transfer packet data structure.

The server receives the transfer packet at step 542 and forwards it to the sender. The sender receives the transfer packet from the recipient at step 536, and then at step 544 (FIG. 6B) it verifies the validity of version and account numbers. If these numbers are invalid, a Negative Acknowledge (NAK) is sent to the server at step 546 and the sender enters the wait for messages state 548. The server receives the Negative Acknowledge (NAK) at step 564 and forwards it to the recipient, which receives the Negative Acknowledge (NAK) at step 566, as detected at step 568 causing the recipient to enter the waiting for messages state 570.

In the typical case when the version and account numbers are verified, the sender side moves on to step 550 and the sender computes CompareProofB to prove the identity of the recipient, while at step 552 the sender computes ProofA to prove the identity of the sender. At step 554 the sender computes DeltaKeyA=HMAC(LTK)(ChallengeA, ChallengeB, "DELTA KEY") XOR SKey, utilized by the receiver to obtain the session key. At step 556 the sender computes KeyProofA=HMAC(SKEY)(ChallengeA, ChallengeB, "VERIFY2") to prove the Long Term Key (LTK). At step 558 the sender computes FileProofA=HMAC(LTK)(ChallengeA, ChallengeB, File, "Verify3") which is used to prove that the entire file was sent unchanged.

If CompareProofB does not match ProofB from the recipient side as detected at step 560, a Negative Acknowledge (NAK) is sent to the server at step 546 and the sender enters the wait for messages state 548. The server receives the Negative Acknowledge (NAK) at step 564 and forwards it to the recipient, which is received by the recipient at step 566, determined to be a NAK at step 568, whereby the recipient is caused to enter the waiting for messages state at step 570.

In the more typical case of matching proofs, detected at step 560, the process advances to step 562, with the sender side transmitting a second transfer packet Handshake Packet A2 to the server. Table 7 represents an example embodiment of this second transfer packet.

The server receives the transfer packet at step 564 and forwards it to the recipient, which is received by the recipient at step 566, which once determined to not be a NAK at step 568, causes the recipient to calculate TestProofB=HMAC(LTK)(ChallengeA, ChallengeB, "VERIFY2"), that is used to prove the identity of the sender at step 572. At step 574, the recipient calculates the session key, SKey=HMAC(LTK)(ChallengeA, ChallengeB, "DELTA KEY") XOR DeltaKey, that is used to decrypt the file. At step 576 the recipient calculates KeyProofB=HMAC(SKEY)(ChallengeA, ChallengeB, "VERIFY2") which is used to verify the session key.

Then, at step 578 (on FIG. 6C), CompareProofA is compared to ProofA and KeyProofA is compared with KeyProofB. If either proof fails, a Negative Acknowledge (NAK) is sent 580 to the server, and a wait for messages state 582 entered. The server receives the NAK at step 586 and forwards it to the sender at 588, whereby the sender determines it is a NAK at step 590 and enters the wait for messages state 592.

If the proofs match back at step 578, which is most typical, the process advances on the recipient side by sending an Acknowledge message (ACK) to the server at step 584, which is received by the server at step 586 and forwards it to the sender. The sender receives an Acknowledge message (ACK) message at step 588, which is determined to not be a NAK at step 590, whereby the system commences file transfer at step 594, and waits for messages 596. The file transfer is forwarded to the recipient by the server at step 598 and a wait for messages entered 600. It is expected that the presence of the server in the middle of the transfer will not noticeably impact the transfer speed. The file is received by the recipient at step 602.

Upon completion of the transfer, both the sender and the server enter the waiting for messages state 600, and the recipient continues to step 604 to calculate FileProofB=HMAC(LTK)(ChallengeA, ChallengeB, File, "Verify3"), which is utilized to verify that the file arrived unchanged. The received FileProofA and the calculated FileProofB are compared in step 606. If the proofs do not match then the recipient enters the wait for messages state 608.

At step 610 the file is decrypted using the SKey, and uncompressed 612 into separate files, after which the recipient enters the wait for messages state 614.

FIG. 7 and FIG. 8 illustrate the process of selecting the files for transfer. In FIG. 7 the general layout of the screen shot 700 is depicted, having title "ACME Datacom's AltNet". To be more readily recognized by users, the caller and recipient information is configured much like addresses in a contact manager, and may be interfaced to a contact manager as desired. Information, including caller account number is seen 702 with call name field 704, that preferably has a drop down selection. The recipient is similarly selected from a name drop down 708 and information about that party 706. Action selections are seen at the bottom of the screen with a tab selected for "Send Files" 710, within which is seen a folder tree 712 with an individual folder selected 714 and its contents seen in the center section 716. The far right pane 718 shows no files have yet been selected using selection button 720. FIG. 8 depicts a screen shot in which files have already been selected for transfer.

Figure 9:
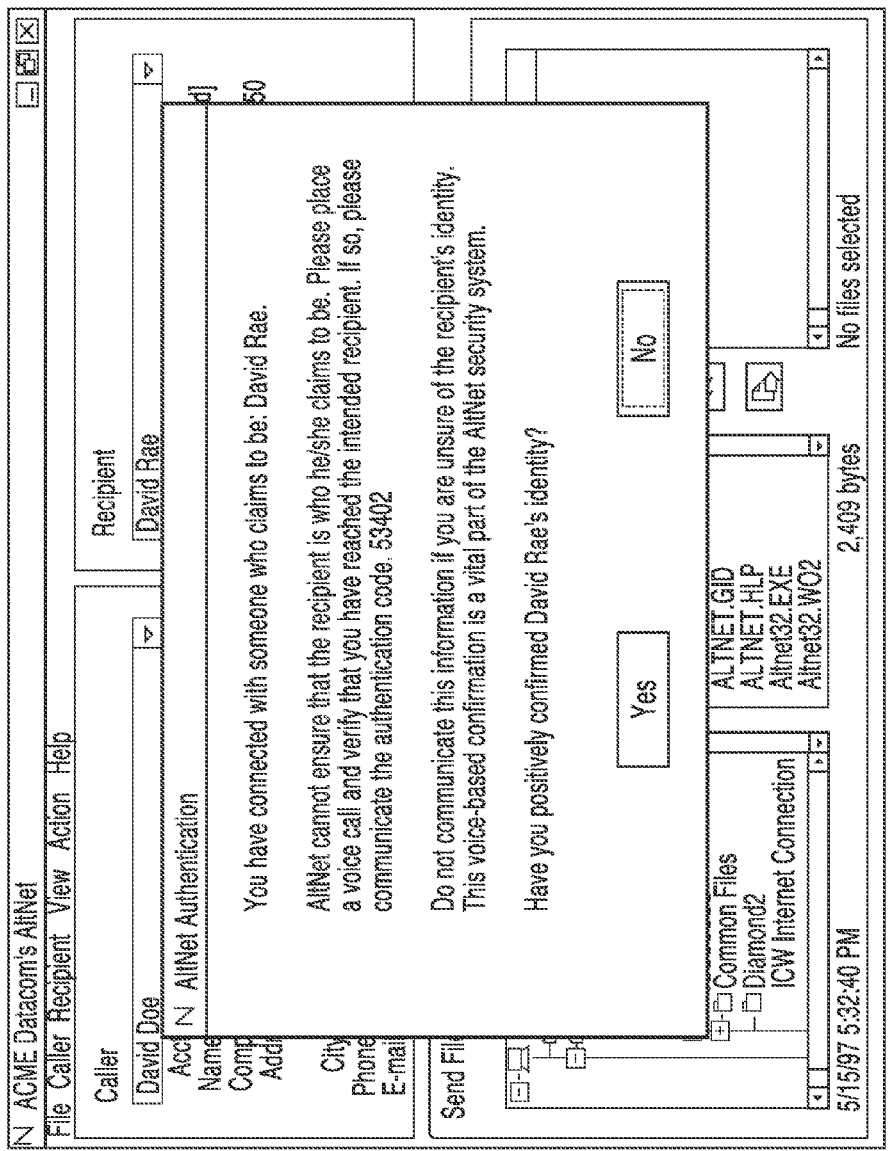
FIG. 9 is a screen shot representation of an identity confirmation pop-up window at the sender side according to an embodiment of the present invention.
Figure 10:
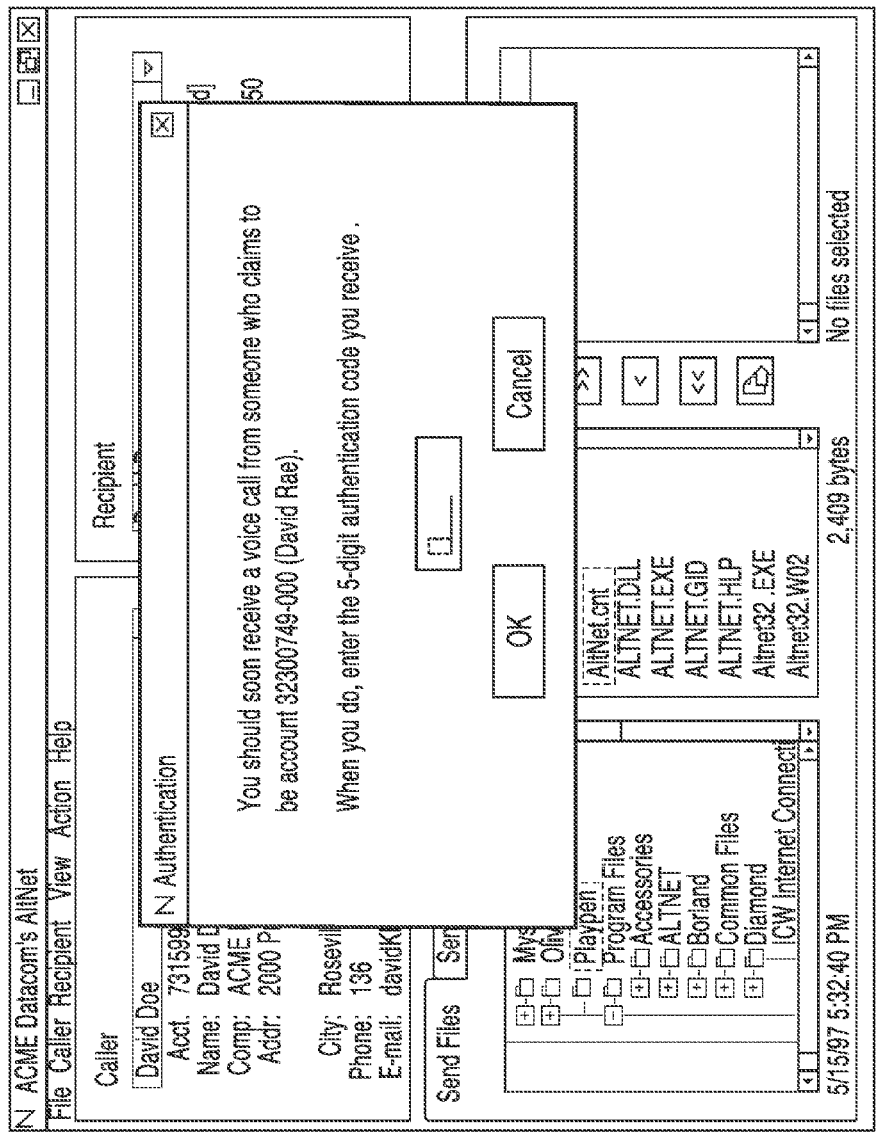
FIG. 10 is a screen shot of an authentication entry pop-up window at the sender side according to an embodiment of the present invention.

FIG. 9 and FIG. 10 represent example screen shots of pop-up window confirmations generated by the system on the sender side. The pop-up window in FIG. 9 shows a sender confirmation asking if the user has positively confirmed the identity of the recipient, which has been popped up over the send file screen of FIG. 7. The pop-up window In FIG. 10 shows a sender confirmation for authenticating the recipient asking the sender to enter an authentication code as received from the recipient over a secondary communications medium.

Figure 11:
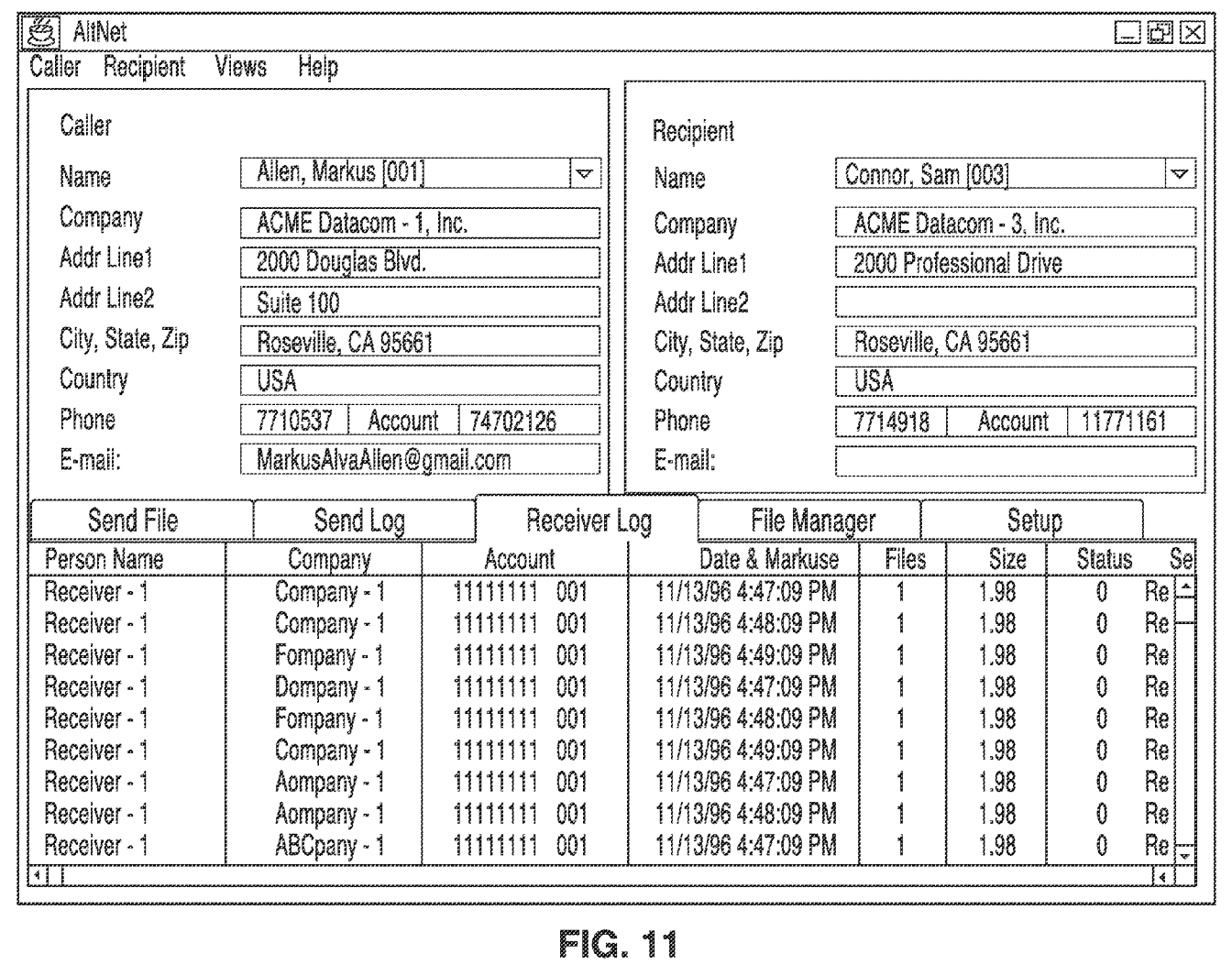

FIG. 11 through FIG. 13 depict aspects of the manner in which the transfer of files is recorded by the sender and recipient. Assuming the files were successfully decompressed at the receiver side, the session is then displayed in the inbox of the recipient, such as exemplified in the screen shot of FIG. 11. In this figure the number of files within a session are denoted in the column entitled "Files". Those file names can, in turn, be viewed individually in a related screen overlay. FIG. 12 and FIG. 13, depict an example arrangement of a send log, which is very similar to the receive log of FIG. 11, and which shows the transferred files, listed by the recipient or sender, depending on which log is examined, the company, account, the date/time, and other related information. In FIG. 12, commands are displayed within the send log of "view contents", "delete log entry", "clear log", and "log report", as well as a check box for "show all". The screen of FIG. 13 depicts the choice of "view contents" with the contents shown in lower portion of the screen. It will be appreciated that in each of FIG. 11 through FIG. 13, the upper portion of the screen maintains the "envelope" paradigm, while the lower portion of these screens maintains a file arrangement which identifies the directories in a left window and files within the directories in a second window to the right of the directories window.

From the discussion above it will be appreciated that the invention can be embodied in various ways, including the following:

1. A system for secure exchange of data intermediated by a trusted server interposed between a sender device and a receiver device on a packet-based network, comprising: a trusted intermediary server configured to interface with a sender device and a receiver device over a packet-based network to intermediate transmissions between the sender and the receiver over the packet-based network as a first communication path; wherein said trusted intermediary server is configured for interfacing with application programming executing at the sender device and at the receiver device for establishing the first communication path from the sender device to said trusted intermediary server to the receiver device; wherein said trusted intermediary server must be used in combination with a security key communicated between the sender device and the receiver device over a second communication path without being intermediated by said trusted intermediary server; said trusted intermediary server configured to receive a first transmission initiated by said sender device, to verify authenticity of said sender device, to initiate a second transmission to said receiver device, and to verify authenticity of the receiver device; said trusted intermediary server configured to operably retain a linkage between the sender device and the receiver device and to communicate encrypted data received from application programming at the sender device to application programming at the receiver device, following verification of authenticity of both said sender device and said receiver device.

2. The system recited in claim 1, wherein the sender device and the receiver device are aware of the internet protocol (IP) address of the trusted intermediary server, while the sender and the receiver are not aware of the IP addresses of each other.

3. The system recited in claim 1, wherein said trusted intermediary server does not drop out of the connection between the sender device and the receiver device as communication progresses.

4. The system recited in claim 1, wherein said trusted intermediary is configured to connect to the sender device and the receiver device, which are connected to the same intranet, or to an Internet, or to intranets which are connected to the Internet, for packet-based communication between the sender device and the receiver device with said trusted intermediary server.

5. The system recited in claim 1, wherein said server of a trusted intermediary comprises one or more servers acting in the capacity of said trusted intermediary.

6. The system recited in claim 1, wherein said trusted intermediary server is configured for interfacing with the sender device and the receiver device as selected from the group of network-enabled computer devices consisting of personal computers, workstations, cell phones, tablet computing devices, point-of-sale (POS) devices, and integrated/embedded computer devices.

7. The system recited in claim 1, wherein said trusted intermediary server is configured for communicating through a private port of the sender device and/or the receiver device which is opened for use in communicating with said trusted intermediary server by application programming executing on the sender device and/or the receiver device.

8. The system recited in claim 1, wherein the second communications path comprises a different medium than the first communications path.

9. The system recited in claim 8, wherein the second communications path is selected from a group of communication medium consisting of public-switched telephone network (PSTN), cellular telephone network, and instant messaging medium.

10. The system recited in claim 1, wherein the second communications path comprises a separate networking session not operating through said trusted intermediary server.

11. The system recited in claim 1, wherein said trusted intermediary server is configured for verifying authenticity of the sender device and the receiver device comprising verifying that account numbers of each are valid.

12. The system recited in claim 1, wherein said trusted intermediary server is further configured for logging time and/or amount of data transferred between the sender device and the receiver device during a secure exchange of data.

13. The system recited in claim 1, further comprising an email server configured for interfacing with said trusted intermediary server.

14. The system recited in claim 1, further comprising a secure file server configured for storing files to be communicated between the sender device and the receiver device in an encrypted form.

15. The system recited in claim 1, wherein data transfer by said trusted intermediary server between the sender device and the receiver device requires completion of a call manager protocol, a key exchange protocol, and a data exchange protocol.

16. The system recited in claim 1, wherein said trusted intermediary server is implemented in a cloud computing environment.

17. The system recited in claim 16, wherein said cloud computing environment comprises a software as a service (SaaS) computer environment.

18. An apparatus for intermediating secure data exchange between a sender device and a receiver device, comprising: a trusted intermediary server configured to interface with a sender device and a receiver device over a packet-based network as a first communication path; and programming executable on said trusted intermediary server to intermediate transmissions between the sender and the receiver over the first communication path by steps comprising: receiving a transmission initiated by the sender device, and verifying authenticity of the sender device; initiating a second transmission to the receiver device, and verifying authenticity of the receiver device; receiving encrypted selected data from the sender device and communicating it to the receiver device as a first transmission across said first communications path by said trusted intermediary server; and retaining a linkage between the sender device and the receiver device by said trusted intermediary server for communication of encrypted data from the sender device to the receiver device which is configured for decrypting selected encrypted data from the sender device; wherein said trusted intermediary server must be used in combination with a security key communicated between the sender device and the receiver device over a second communication path without being intermediated by said trusted intermediary server.

19. The apparatus recited in claim 18, wherein said trusted intermediary server is configured for interoperating with the sender device and/or the receiver device to open and utilize a private port in the sender device and/or receiver device for communication with said trusted intermediary server.

20. A method for the secure exchange of data between a sender device and a receiver device over a packet-based network using a trusted intermediary server, comprising: establishing a packet-based network connection, as a first communication path between a sender device and a trusted intermediary server; establishing a connection over said packet-based network connection between said trusted intermediary server and a receiver device, wherein said trusted intermediary server intermediates transmissions between said sender device and said receiver device over said first communication path; wherein said sender device, said receiver device, and said trusted intermediary server device are computer devices configured with programming for performing client-server communications operations over the packet-based network connection; establishing a second communications path between said sender device and said receiver device utilizing a different medium and/or session than said first communications path which is not intermediated by said trusted intermediary server; encrypting selected data for communication from said sender device to said receiver device to initiate a first transmission across said first communications path with said trusted intermediary server; receiving a first transmission at said trusted intermediary server initiated by said sender device, and verifying authenticity of said sender device; initiating a second transmission to said receiver device, and verifying authenticity of said receiver device; communicating a security key from said sender device through said second communications path to said receiver device; operably retaining a linkage by said trusted intermediary server between said sender device and said receiver device for communication of encrypted data following verification of authenticity of both said sender device and said receiver device; and responding to said second transmission from said trusted intermediary server by said receiver device to receive and decrypt selected encrypted data from said sender device.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

First Handshake Packet Sent by the Sender

| Field | Comments | Size (bytes) |
|---|---|---|
| STX | Framing | 1 |
| Low Version | Lowest version supported | 1 |
| Hi Version | Highest version supported | 1 |
| Account | Client's account number | 12 |
| DH_result_C | $g^{eC}$ mod n | 128 |
| Hash_RandomC | SHA(RandomC) | 20 |
| EM | Framing | 1 |

TABLE 2

Recipient Response Handshake Packet

| Field | Comments | Size (bytes) |
|---|---|---|
| STX | Framing | 1 |
| Version | version being spoken | 1 |
| DH_result_S | $g^{eS}$ mod n | 128 |
| ProofS | SHA(SharedSecret | $g^{eC*}g^{eS}$ mod n) | 20 |
| EM | Framing | 1 |

TABLE 3

First Handshake Packet Sent by Sender

| Field | Comments | Size (bytes) |
|---|---|---|
| STX | Framing | 1 |
| Low Version | Lowest version supported | 1 |
| Hi Version | Highest version supported | 1 |
| AccountA | Sender's account number | 12 |
| DH_result_A | $g^{eA}$ mod n | 128 |
| Hash_RandomA | SHA(RandomA) | 20 |
| EM | Framing | 1 |

TABLE 4

Responsive Handshake Packet (Handshake Packet B1)

| Field | Comments | Size (bytes) |
|---|---|---|
| STX | Framing | 1 |
| Version | version being spoken | 1 |
| AccountB | Recipient's account number | 12 |
| DH_result_B | $g^{eA}$ mod n | 128 |
| ProofB | SHA("KEY_ID" | $g^{eA*}g^{eB}$ mod n) | 20 |
| EM | Framing | 1 |

TABLE 5

Transfer Packet A1

| Field | Comments | Size (bytes) |
|---|---|---|
| STX | Framing | 1 |
| Low Version | Lowest version supported | 1 |
| Hi Version | Highest version supported | 1 |
| $Account_A$ | Sender's account number | 12 |
| $Account_B$ | Recipient's account number | 12 |

TABLE 5-continued

Transfer Packet A1

| Field | Comments | Size (bytes) |
|---|---|---|
| $Challenge_A$ | Random Challenge from Sender | 20 |
| ETX | Framing | 1 |

TABLE 6

Recipient Transfer Packet Data Structure

| Field | Comments | Size (bytes) |
|---|---|---|
| STX | Framing | 1 |
| Version | Version being spoken | 1 |
| $Account_B$ | Recipient's account number | 12 |
| $Challenge_B$ | Random Challenge from Recipient | 20 |
| ETX | Framing | 1 |

TABLE 7

Second Transfer Packet, Handshake Packet A2

| Field | Comments | Size (bytes) |
|---|---|---|
| STX | Framing | 1 |
| AccountB | Recipient's account number | 12 |
| ProofA | HMAC(LTK)(ChallegeA, ChallengeB, "VERFY2") | 20 |
| DeltaKeyA | HMAC(LTK)(ChallegeA, ChallengeB, "DELTA KEY") XOR SKey | 20 |
| KeyProofA | HMAC(SKEY)(ChallegeA, ChallengeB, "VERIFY2") | 20 |
| FileProofA | HMAC(LTK)(ChallegeA, ChallengeB, File, "Verify3") | 20 |
| ETB | Framing | 1 |

What is claimed is:

1. A system for secure exchange of data intermediated by a trusted server interposed between a sender device and a receiver device on a packet-based network, comprising:

a trusted intermediary server configured to interface with a sender device and a receiver device over a packet-based network to intermediate transmissions between the sender and the receiver over the packet-based network as a first communication path;

wherein said trusted intermediary server is configured for interfacing with application programming executing at the sender device and at the receiver device for establishing the first communication path from the sender device to said trusted intermediary server to the receiver device;

wherein said trusted intermediary server must be used in combination with a security key communicated between the sender device and the receiver device over a second communication path without being intermediated by said trusted intermediary server;

said trusted intermediary server configured to receive a first transmission initiated by said sender device, to verify authenticity of said sender device, to initiate a second transmission to said receiver device, and to verify authenticity of the receiver device;

said trusted intermediary server configured to operably retain a linkage between the sender device and the receiver device and to communicate encrypted data received from application programming at the sender device to application programming at the receiver device, following verification of authenticity of both said sender device and said receiver device.

2. The system recited in claim 1, wherein the sender device and the receiver device are aware of the internet protocol (IP) address of the trusted intermediary server, while the sender and the receiver are not aware of the IP addresses of each other.

3. The system recited in claim 1, wherein said trusted intermediary server does not drop out of the connection between the sender device and the receiver device as communication progresses.

4. The system recited in claim 1, wherein said trusted intermediary is configured to connect to the sender device and the receiver device, which are connected to the same intranet, or to an Internet, or to intranets which are connected to the Internet, for packet-based communication between the sender device and the receiver device with said trusted intermediary server.

5. The system recited in claim 1, wherein said server of a trusted intermediary comprises one or more servers acting in the capacity of said trusted intermediary.

6. The system recited in claim 1, wherein said trusted intermediary server is configured for interfacing with the sender device and the receiver device as selected from the group of network-enabled computer devices consisting of personal computers, workstations, cell phones, tablet computing devices, point-of-sale (POS) devices, and integrated/embedded computer devices.

7. The system recited in claim 1, wherein said trusted intermediary server is configured for communicating through a private port of the sender device and/or the receiver device which is opened for use in communicating with said trusted intermediary server by application programming executing on the sender device and/or the receiver device.

8. The system recited in claim 1, wherein the second communications path comprises a different medium than the first communications path.

9. The system recited in claim 8, wherein the second communications path is selected from a group of communication medium consisting of public-switched telephone network (PSTN), cellular telephone network, and instant messaging medium.

10. The system recited in claim 1, wherein the second communications path comprises a separate networking session not operating through said trusted intermediary server.

11. The system recited in claim 1, wherein said trusted intermediary server is configured for verifying authenticity of the sender device and the receiver device comprising verifying that account numbers of each are valid.

12. The system recited in claim 1, wherein said trusted intermediary server is further configured for logging time and/or amount of data transferred between the sender device and the receiver device during a secure exchange of data.

13. The system recited in claim 1, further comprising an email server configured for interfacing with said trusted intermediary server.

14. The system recited in claim 1, further comprising a secure file server configured for storing files to be communicated between the sender device and the receiver device in an encrypted form.

15. The system recited in claim 1, wherein data transfer by said trusted intermediary server between the sender device and the receiver device requires completion of a call manager protocol, a key exchange protocol, and a data exchange protocol.

16. The system recited in claim 1, wherein said trusted intermediary server is implemented in a cloud computing environment.

17. The system recited in claim 16, wherein said cloud computing environment comprises a software as a service (SaaS) computer environment.

18. An apparatus for intermediating secure data exchange between a sender device and a receiver device, comprising:
    a trusted intermediary server configured to interface with a sender device and a receiver device over a packet-based network as a first communication path; and
    programming executable on said trusted intermediary server to intermediate transmissions between the sender and the receiver over the first communication path by steps comprising:
    receiving a transmission initiated by the sender device, and verifying authenticity of the sender device;
    initiating a second transmission to the receiver device, and verifying authenticity of the receiver device;
    receiving encrypted selected data from the sender device and communicating it to the receiver device as a first transmission across said first communications path by said trusted intermediary server; and
    retaining a linkage between the sender device and the receiver device by said trusted intermediary server for communication of encrypted data from the sender device to the receiver device which is configured for decrypting selected encrypted data from the sender device;
    wherein said trusted intermediary server must be used in combination with a security key communicated between the sender device and the receiver device over a second communication path without being intermediated by said trusted intermediary server.

19. The apparatus recited in claim 18, wherein said trusted intermediary server is configured for interoperating with the sender device and/or the receiver device to open and utilize a private port in the sender device and/or receiver device for communication with said trusted intermediary server.

20. A method for the secure exchange of data between a sender device and a receiver device over a packet-based network using a trusted intermediary server, comprising:
    establishing a packet-based network connection, as a first communication path between a sender device and a trusted intermediary server;
    establishing a connection over said packet-based network connection between said trusted intermediary server and a receiver device, wherein said trusted intermediary server intermediates transmissions between said sender device and said receiver device over said first communication path;
    wherein said sender device, said receiver device, and said trusted intermediary server device are computer devices configured with programming for performing client-server communications operations over the packet-based network connection;
    establishing a second communications path between said sender device and said receiver device utilizing a different medium and/or session than said first communications path which is not intermediated by said trusted intermediary server;
    encrypting selected data for communication from said sender device to said receiver device to initiate a first transmission across said first communications path with said trusted intermediary server;

receiving a first transmission at said trusted intermediary server initiated by said sender device, and verifying authenticity of said sender device;

initiating a second transmission to said receiver device, and verifying authenticity of said receiver device;

communicating a security key from said sender device through said second communications path to said receiver device;

operably retaining a linkage by said trusted intermediary server between said sender device and said receiver device for communication of encrypted data following verification of authenticity of both said sender device and said receiver device; and responding to said second transmission from said trusted intermediary server by said receiver device to receive and decrypt selected encrypted data from said sender device.

* * * * *